(12) United States Patent
Kim

(10) Patent No.: US 6,994,215 B2
(45) Date of Patent: Feb. 7, 2006

(54) SLEEVE RETAINER CLIP FOR A COMPACT DISC BINDER

(75) Inventor: Tae Soo Kim, Seoul (KR)

(73) Assignee: Hai Yang Corporation, Seoul (KR)

( * ) Notice: Subject to any disclaimer, the term of this patent is extended or adjusted under 35 U.S.C. 154(b) by 109 days.

(21) Appl. No.: 10/265,849

(22) Filed: Oct. 7, 2002

(65) Prior Publication Data

US 2004/0065568 A1 Apr. 8, 2004

(51) Int. Cl.
    *B65D 85/57* (2006.01)

(52) U.S. Cl. ............... 206/445; 206/308.1; 206/311; 206/472; 281/27.1; 281/27.2; 402/70; 412/7

(58) Field of Classification Search ............ 206/445, 206/232, 307, 308.1, 308.3, 311, 472; 281/27.1, 281/27.2; 412/7; 402/61, 46, 60, 63–70; 24/2
See application file for complete search history.

(56) References Cited

U.S. PATENT DOCUMENTS

| | | | | |
|---|---|---|---|---|
| 1,513,518 A | | 10/1924 | Pott | |
| 1,549,695 A | * | 8/1925 | Uniack | 281/27.2 |
| 1,558,807 A | | 10/1925 | Horn | |
| 1,708,492 A | * | 4/1929 | Barnes | 281/28 |
| 1,841,603 A | * | 1/1932 | Hutson | 281/27.2 |
| 1,984,790 A | * | 12/1934 | Feley | 281/27.2 |
| 2,017,342 A | * | 10/1935 | Dawson | 281/50 |
| 2,084,552 A | * | 6/1937 | Del Camp | 281/27.2 |
| 2,302,171 A | * | 11/1942 | Baughman | 402/70 |
| 2,323,285 A | * | 6/1943 | Trussell | 402/21 |
| 2,489,706 A | * | 11/1949 | Emmer | 281/27.2 |
| 2,534,522 A | * | 12/1950 | Kriegel | 281/27.2 |
| 4,307,972 A | | 12/1981 | Errichiello | |
| 4,733,985 A | * | 3/1988 | Moosmuller | 402/27 |
| 5,549,203 A | | 8/1996 | Weisburn et al. | |
| 5,611,633 A | * | 3/1997 | Whaley | 402/60 |
| 5,653,544 A | | 8/1997 | Cabre Pijoan et al. | |
| 5,667,323 A | * | 9/1997 | Whaley | 402/26 |
| 6,179,507 B1 | | 1/2001 | Lam | |
| 6,200,057 B1 | | 3/2001 | Youngs et al. | |

FOREIGN PATENT DOCUMENTS

| | | |
|---|---|---|
| JP | 54-45624 | 3/1979 |
| JP | 63-130276 | 8/1988 |

* cited by examiner

*Primary Examiner*—Jim Foster
(74) *Attorney, Agent, or Firm*—Dorr, Carson, Sloan, Birney & Kramer, P.C.

(57) ABSTRACT

A inverted U-shaped retainer clip is provided for securing sleeves to a binder for storing and protecting disc type objects. One embodiment of the retainer clip includes a body portion as well as downwardly extending legs on each end. Each leg terminates in a coupling device having outwardly extending fingers having a notch on the outer surface of each finger. A pair of receptacles is used in conjunction with each clip and is designed to receive the coupling devices and engage the notch on each finger to secure the clip within the receptacles. The receptacles are installed in the binder through the back side of apertures formed in a reinforcement strip provided on the inside of the spine. After the sleeves are threaded on the body portion of the clip the ends are inserted into the receptacles to permanently retain the sleeves and clip in the binder.

28 Claims, 14 Drawing Sheets

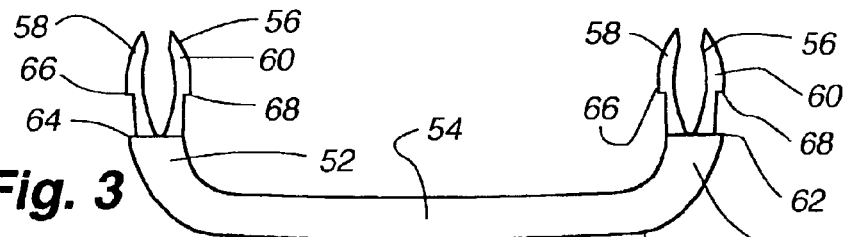
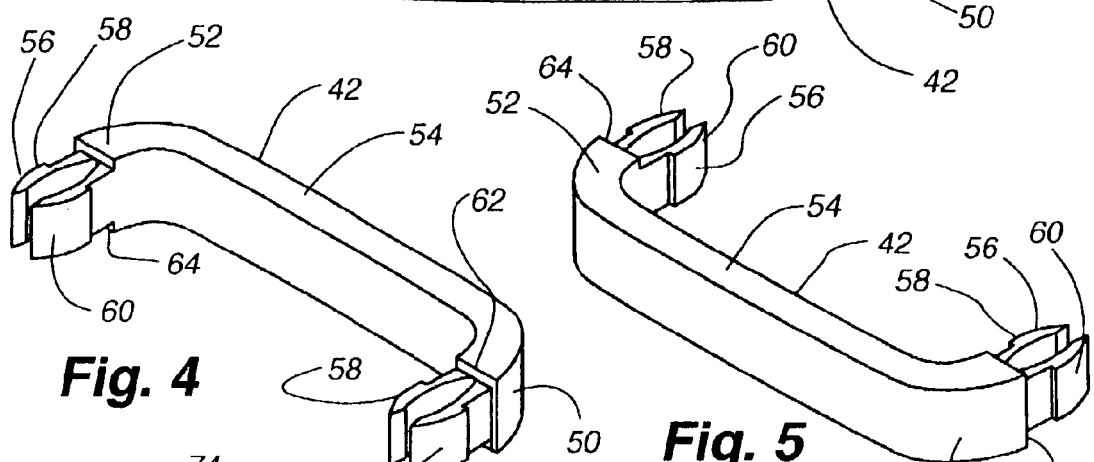
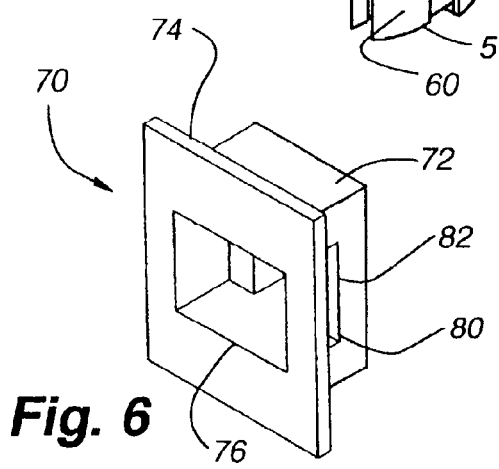
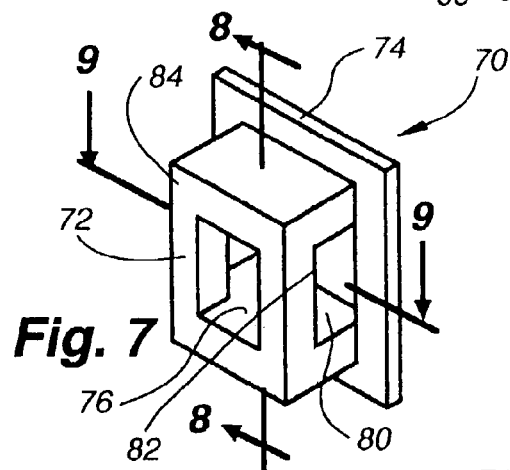
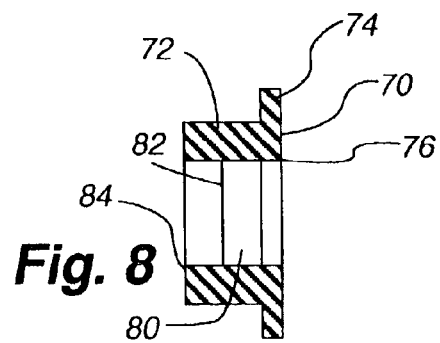
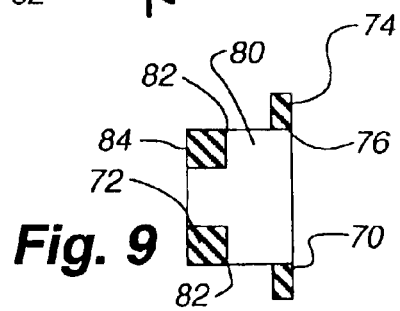

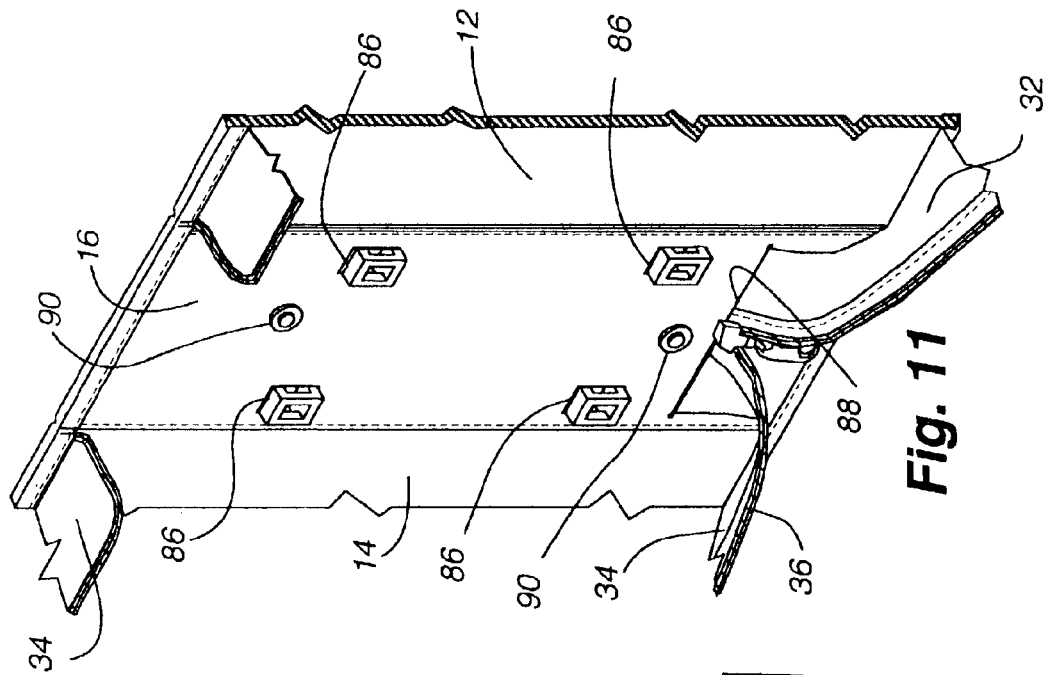
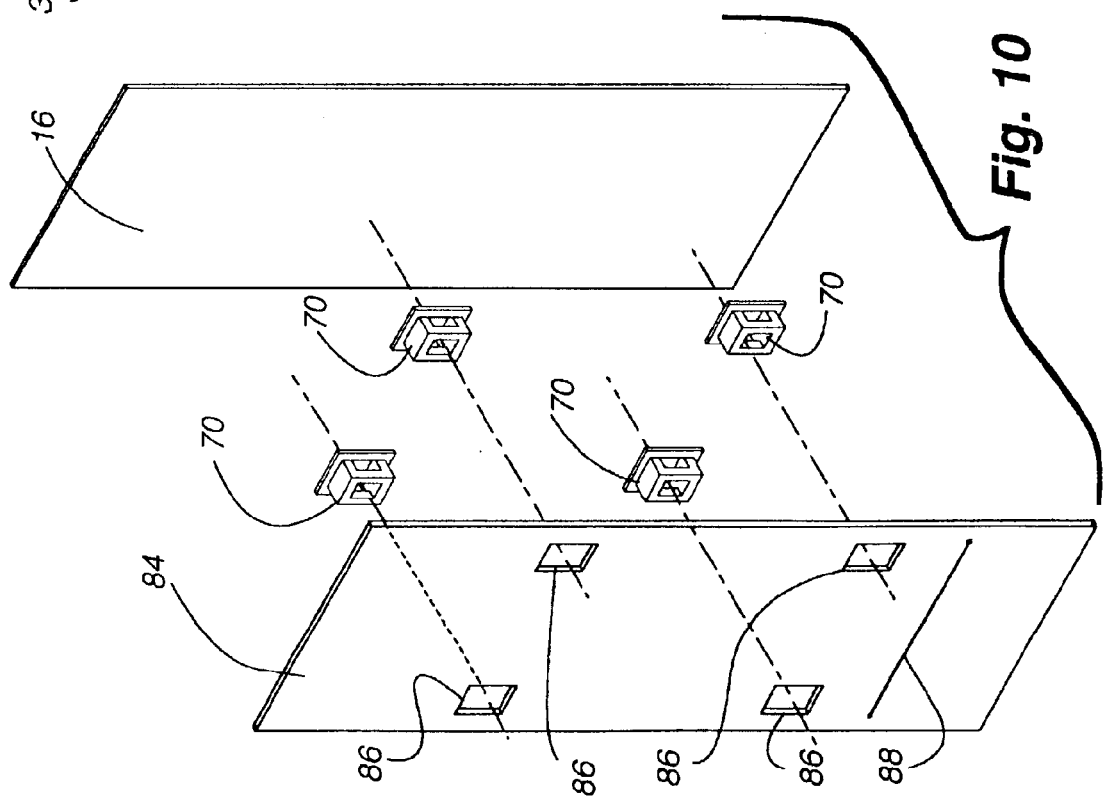

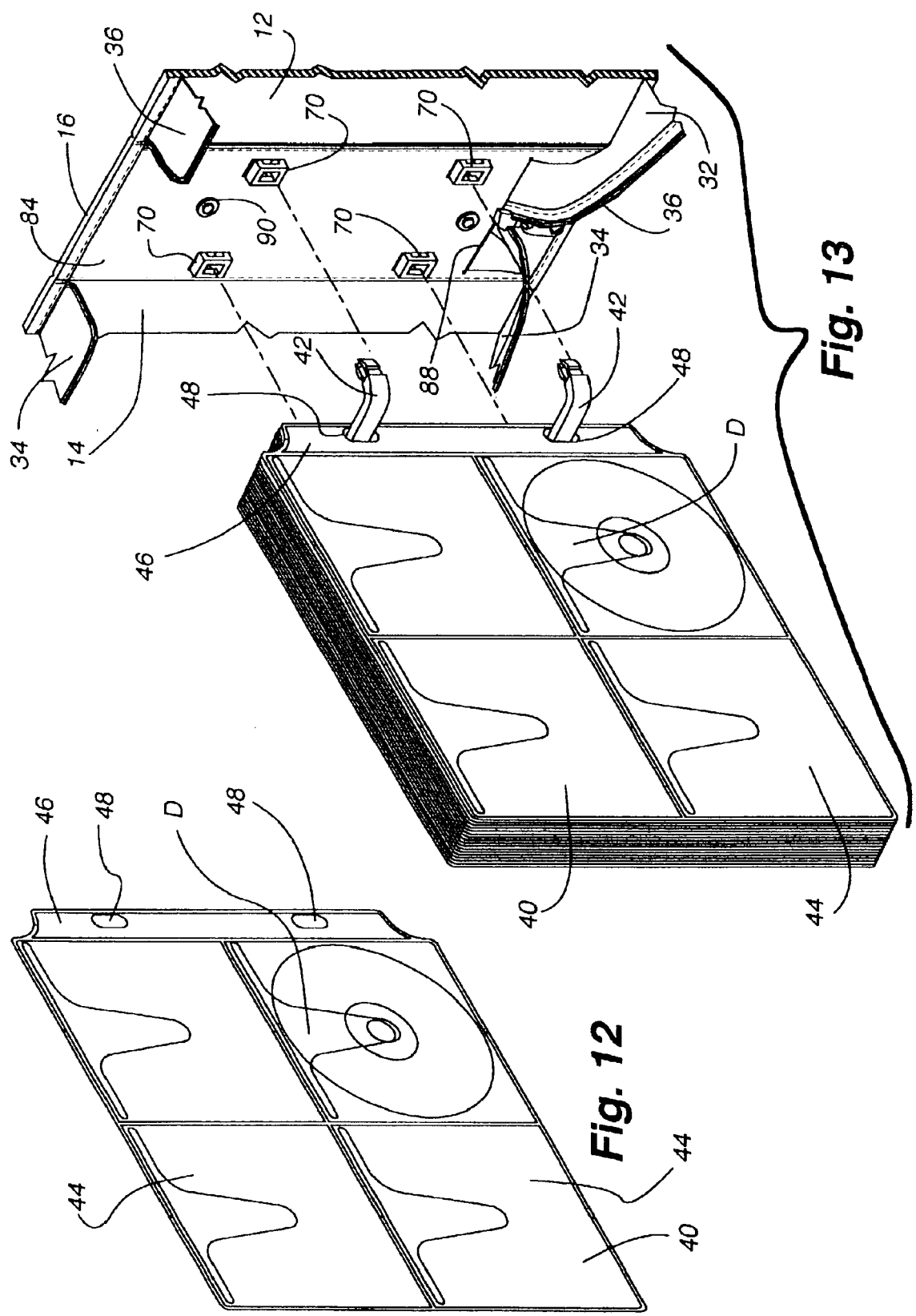

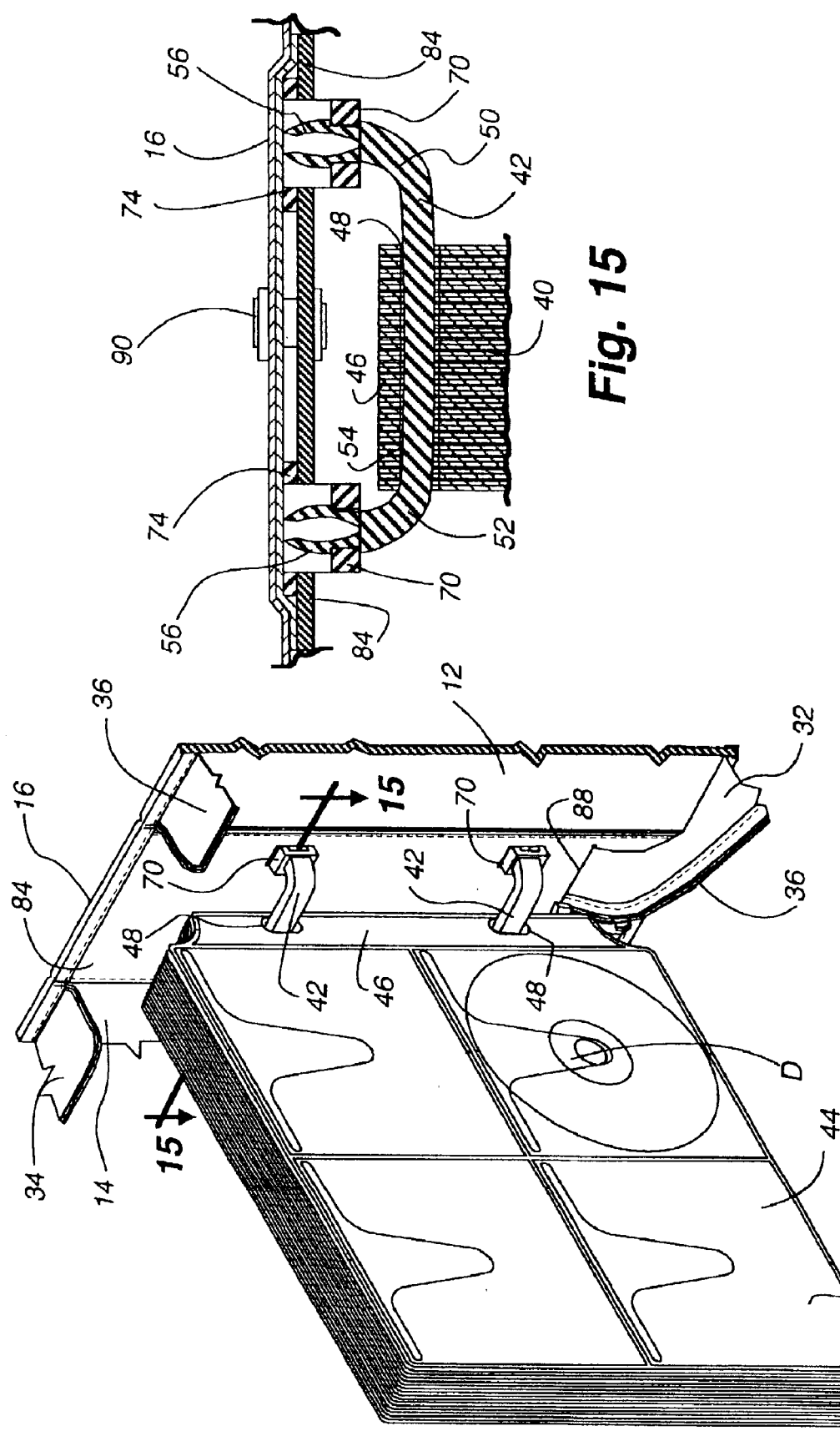

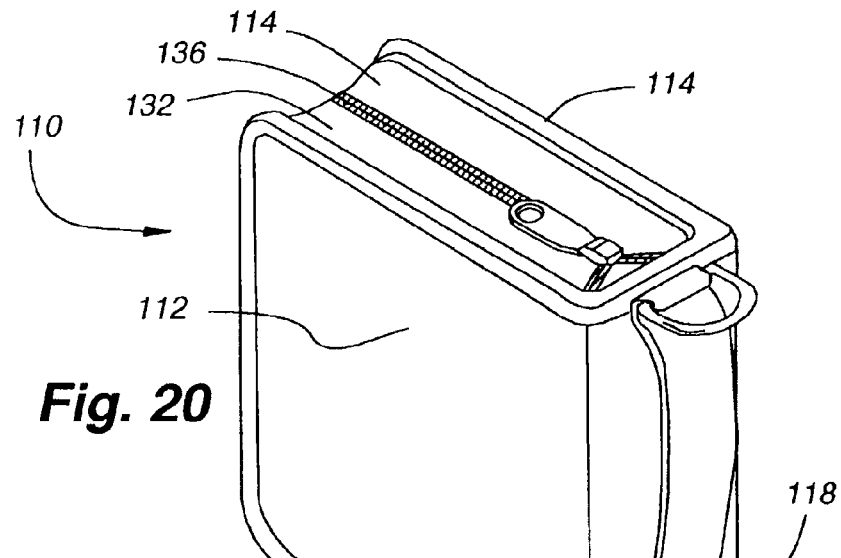
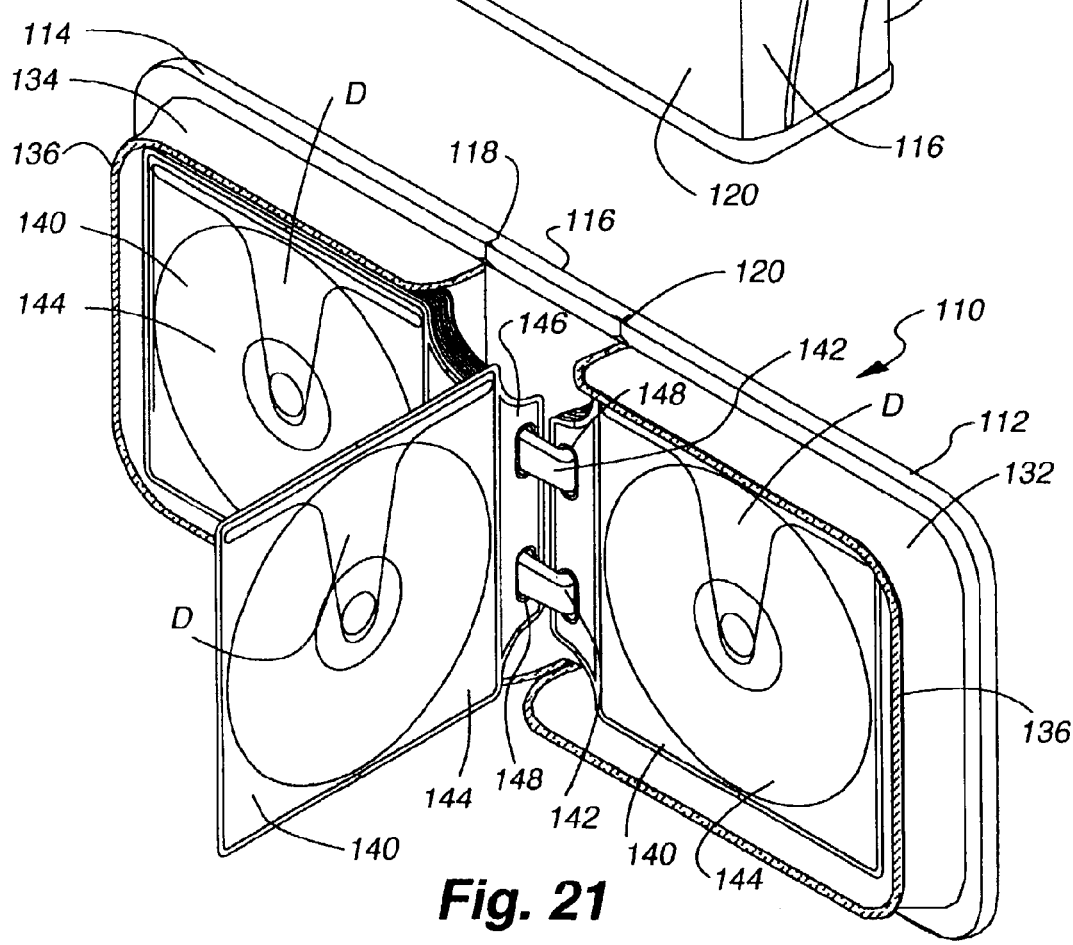

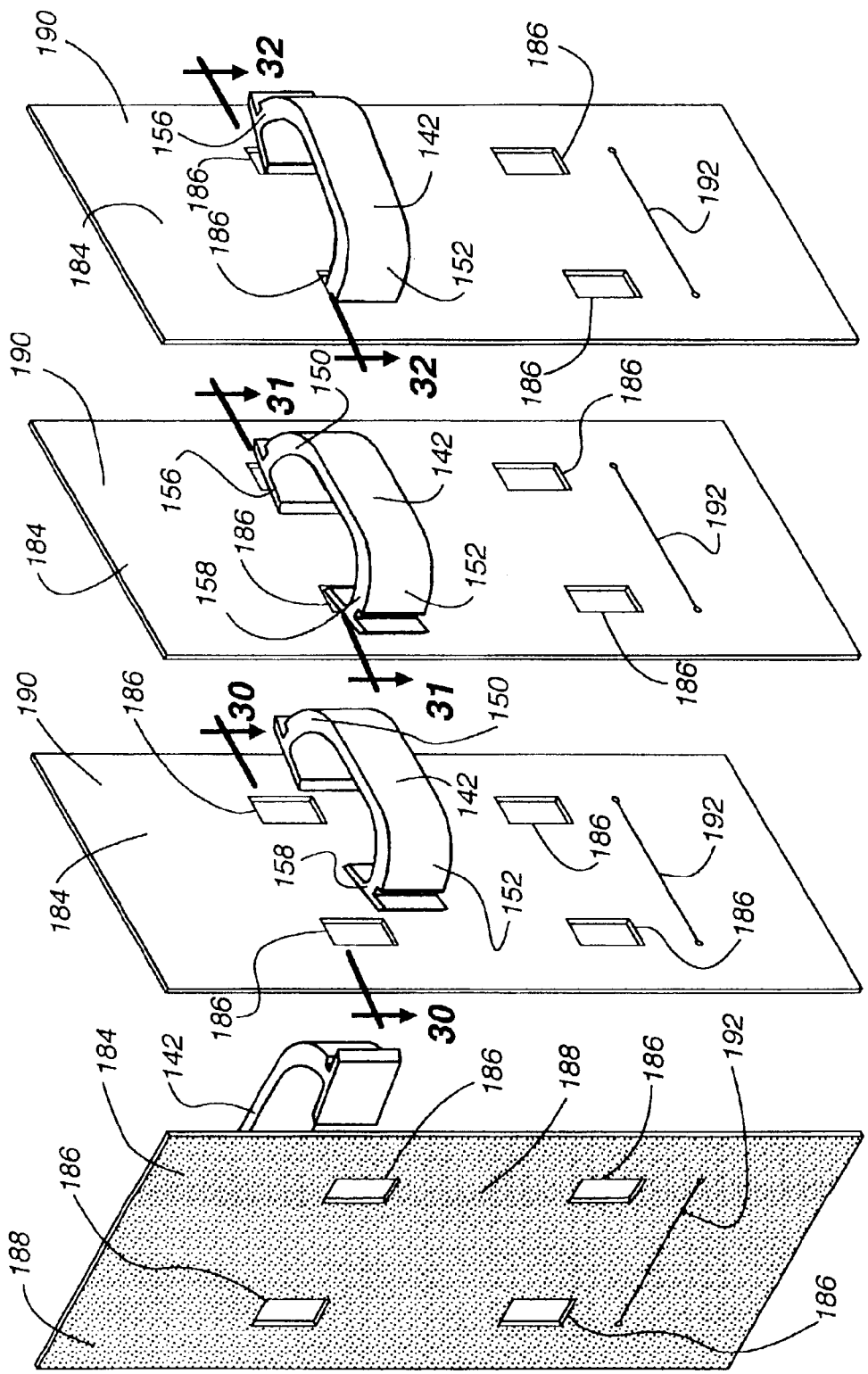

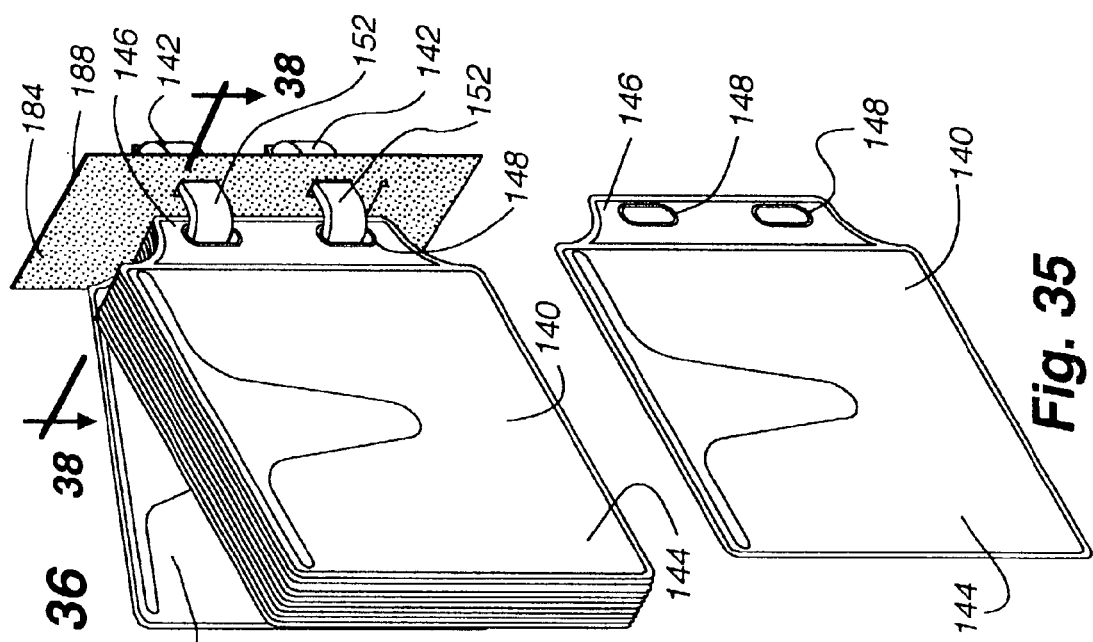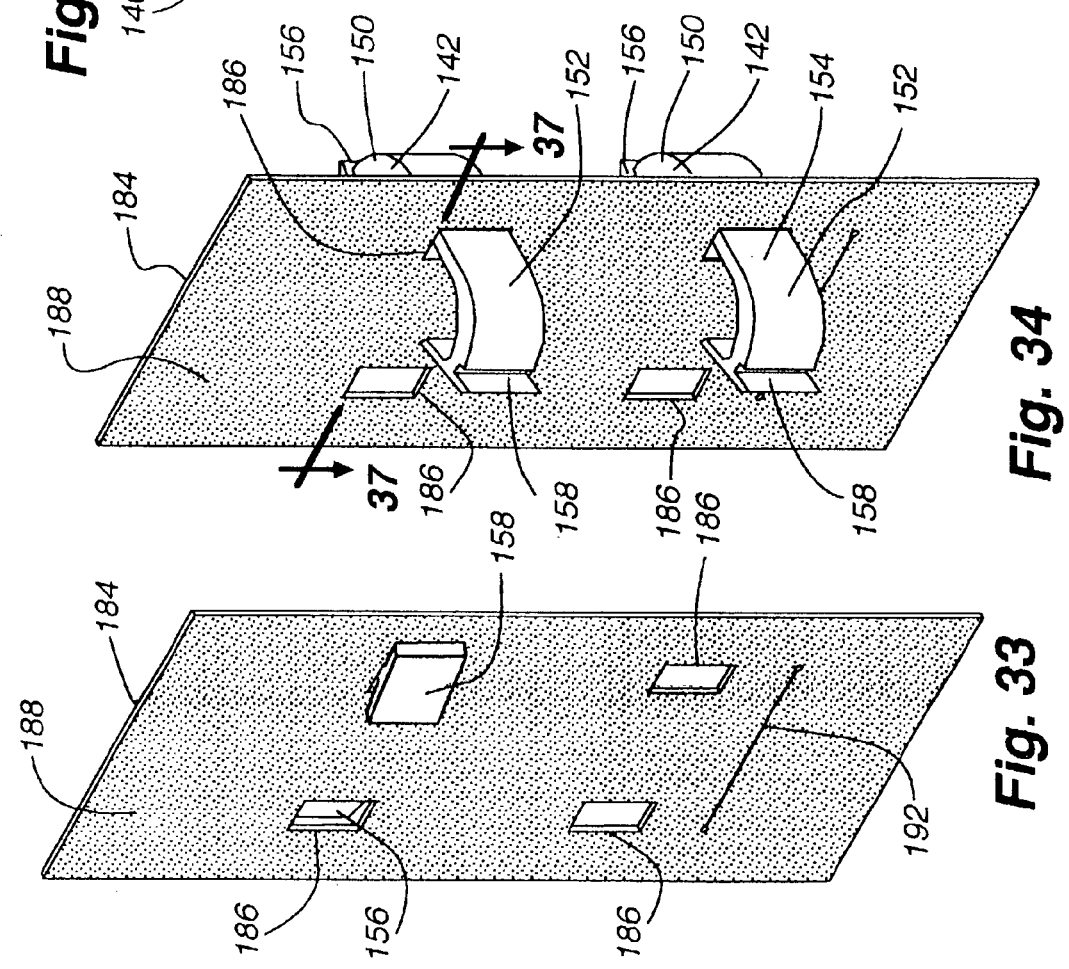

SLEEVE RETAINER CLIP FOR A COMPACT DISC BINDER

RELATED APPLICATIONS

Background of the Invention

1. Field of the Invention

This invention is directed to a retainer clip for fastening moveable sleeves within a binder. It is more specifically directed to a retainer clip for permanently attaching sleeves for holding compact discs in a wallet type binder.

2. Discussion of the Background

In the past, loose leaf binders for storing sheet materials, such as paper or plastic film are known to exist in a number of designs and configurations. In many cases, the loose leaf binder incorporates a metal base attached to the spine of the binder with a plurality of split rings mounted within the base and arranged with a toggle device so that the rings can be opened and closed allowing the sheets to be easily added or removed from the binder.

It is also well known that binders can be provided in a configuration wherein the spine or cover contains various types of rings or retainers which permanently attach the sheets or leaves to the spine or a cover of the binder. The retainers in this configuration usually are formed as a ring which can be permanently closed or sealed or could be a helical coil fabricated from metal or plastic wire which is threaded through a plurality of holes provided along the edge of the sheets or leaves so as to attach these to the spine of the binder. In other versions of this type of retainer a plurality of metal or plastic rings can be inserted through the spine of the binder and the edges of the sheets or leaves with the rings permanently fixed so as to prevent the removal of the sheets or leaves from the binder.

Since the introduction of the small phonograph records and more recently compact discs and DVD's, various ways of storing and carrying these items have been produced. Usually these storage devices are provided in the form of a large notebook type binder, or in some cases, a smaller wallet type binder or carrier, with a plurality of internal sleeves in order to conveniently hold the records or compact discs and to protect them against loss or damage.

These binders have taken on the appearance of a folder or notebook configuration having a front and back cover with an intermediate spine and an attaching mechanism for securing, either permanently or temporarily, sleeves which are sized and configured for holding and storing one or more of the discs. In some cases, these binders include zippers or other types of enclosure fasteners around the outside edge of the covers so as to close the binder to prevent lose and protect the contents.

These types of storage devices are well known in the art with most of these devices directed to the loose leaf type configuration. The permanent binders are just as important and provide a benefit in that the sleeves or sheets are permanently attached and cannot be removed or lost. By the same token, sleeves or sheets cannot be added to the binder which could possibly overload the binder and cause distress to the compact discs, DVD's or records which are stored within.

Information Disclosure Statement

The following list of prior art patents sets forth the patents which are known to the applicant and which pertain to the subject matter of this application. These items are listed herein to satisfy the inventor's duty to disclose to the Patent Office and the Patent Examiner all known information which is applicable to the examination of this application.

The Pott patent (U.S. Pat. No. 1,513,518) discloses a binder using a plurality of U-shaped resilient rings. One end of the ring is secured in an anchored hollow post while the opposite end includes a rounded tip. The tip includes a notch on one side away from the hollow pin. In use the ring is sprung towards the hollow pin with the tip entering the socket so that the notch will engage the rim of the socket. In this arrangement, however, the tip can be sprung back towards the hollow tube so that the notch will be disengaged so that the ring can be moved upwardly out of the socket to allow removal of a plurality of leaves which are held within the binder. This patent also discloses the use of a hollow threaded tube and the threading of a knearled screw into the tube to hold the leaves in place. There is no teaching of using the rings in a permanent binder arrangement.

The Horn patent (U.S. Pat. No. 1,558,807) discloses a binder having a plurality of upward extending binder posts anchored in the back cover near the spine. One end of a U-shaped element designed to hold a plurality of leaves within the binder is anchored at the base of the binder post while the other end is held in position by a split pin having a flanged head which is inserted through the end of the element and into the binder post. A shoulder is provided on the tips of the split ends of the pin which engage a series of open slots arranged along the outer edge of the binder post. The shoulder engages a slot on the binder post to hold it in position. The elevation of the pin and thus the position of the retaining element can be adjusted by moving the pin up or down with respect to the binder post. The arrangement disclosed in this patent is also intended to allow the addition or removal of leaves from the binder by merely disengaging the pin from the binder post or socket.

The Pijoan, et al. patent (U.S. Pat. No. 5,653,544) merely discloses a hollow flanged socket and a flanged pin which is inserted through apertures in the sheets of paper with the pin inserted through the socket to bind the sheets of paper. The socket has a downwardly extending beveled ring at its entrance which grips the surface of the pin so as to retain the pin once it is in position. The excess length of the pin is then cut off, as desired. The socket can be split into two sections to allow more elasticity in the socket before insertion of the pin.

The Youngs, et al. patent (U.S. Pat. No. 6,200,057) discloses a storage device for retaining one or more sheet items. The storage device is a notebook type binder having front and rear panels and an intermediate spine section. A plurality of outwardly extending hollow pins are formed in the back panel and a plurality of sheets are stacked over the pins. A hinged closure is connected to the cover and inserted into the end of the hollow pin in order to close off the pin and prevent the removal of the sheets. The closures described in this patent include bifurcated keys which have outwardly extending shoulders to grip an inner ring provided in the closure. Other closures include a series of flexible wedge shaped ribs formed on the closure to grip the inside surface of the hollow pin.

The Errichiello patent (U.S. Pat. No. 4,307,972) shows a similar arrangement to the Yongs, et al. patent in that a storage notebook having a front and back cover and an intermediate spine includes an upwardly extending hollow pin provided in the inside surface of the back cover. The front cover includes the closure which has a beveled head which tightly fits into and grips the end of the hollow pin.

The Lam patent (U.S. Pat. No. 6,179,507) discloses a permanent locking device for use in ring binders. This device has a base member which extends upwardly through an aperture formed in the housing for the ring binder device. A bifurcated pin is inserted through a hole provided in the base member and includes a wedge shaped end with outwardly extending shoulders provided on the pin. The bottom of the mounting member has a flat surface which is equivalent to a slot and retains the pin in the down most position once the pin is inserted through the mounting member. The downwardly positioned pin thus locks the toggle mechanism for the ring binder permanently locking the rings in their closed position.

The Wiseburn, et al. patent (U.S. Pat. No. 5,549,203) describes a retainer arrangement for holding pages or sheets within a binder. An elongated assembly is provided having a hinged base at each end wherein a flexible loop is mounted on each of the hinged members. The assembly can be attached to the spine or binder and the loop members can be pivoted upward to receive the pages of a booklet to be retained within the binder. The ends of the flexible loops contain a circular shoulder and the ends are inserted into a socket having a retainer surface which grips the shoulder provided on the end of the loops. The ends of the loops are secured within the assembly and thus permanently retain the pages within the binder. This binder also has a provision for holding a video game cartridge.

Japanese patent No. 63-130276 ('276) discloses a binder having front and back covers along with an intermediate spine. A pair of inverted U-shaped rings which retain the sheets within the binder are anchored in apertures formed in the elongated base member. The apertures within the base member includes a base slot with a narrower perpendicular channel formed adjacent to the slot with a notch formed at the end of the channel. The ends of the rings are squeezed together so that they enter the slots and are allowed to expand to anchor themselves in the notched channel. The resilience of the material with which the rings are fabricated provide the outwardly extending forces to hold the rings in the channel. These rings are not permanent and can be easily removed to add or remove sheets from the binder.

Japanese patent No. 54-45624 ('624) also discloses a binder having front and back covers with an intermediate spine with a base member formed in the spine area to receive a plurality of resilient rings. Transverse slots are provided in the base member spaced longitudinally along the spine of the notebook. Both of the rings have a flange on each end and are resilient to the point that the ends are spaced together so that one end can be inserted through an opening in the slot with the entire ring moved to one side so that the other end can also be introduced into the same aperture. In this way, the ring is held in position to retain the sheets within the document binder.

SUMMARY OF THE INVENTION

This invention is directed to a retainer clip which is intended to be permanently anchored to the spine in a compact disc wallet or notebook binder. The term wallet, notebook or binder as used herein is intended to cover all types of storage devices which provide easy access to records, compact discs or DVD discs which are contained therein and yet protect these items to prevent them from being scratched, damaged or lost. In most cases, the wallet has the appearance of a binder having a front cover, back cover and an intermediate spine section. The spine section is usually used to provide an arrangement for retaining a plurality of sleeves included for insertion of the discs. In the present arrangement, it is intended that once the storage device is completed, the sleeves will be permanently retained within the wallet, notebook or binder by use of the retainer clips that form the basis of this invention. In accordance with this invention it is to be understood that the retainer clips which form the fixation device for the sleeves are anchored to the spine or cover of the storage device.

The retainer clip, according to the present invention, is formed from a durable material which can be a plastic, synthetic resin, metal or any other material which has characteristics suitable for the arrangement described herein. Although two versions of the retainer clip, according to the present invention, are described herein, it is understood that both of these operate in a similar manner to permanently hold and retain the sleeves within the binder.

In both cases, the spine of the binder can be reinforced with one or more relatively rigid elongated strips of material, usually plastic or fiberboard which contain a plurality of apertures strategically located along the strip. The usual number of retainer clips that are spacedly installed longitudinally along the strip and spine are two or more.

In one embodiment, the clip is formed in a broad inverted U-shaped configuration having a round or rectangular cross-sectional shape. The U-shaped clip includes an elongated body as well as a pair of downwardly extending legs, with each leg ending in a relatively flat flanged foot. The body and legs of the clip usually have the same cross-sectional dimensions which are relatively wide with respect to the thickness of the various sections. The flanged feet are usually the same width as the other portions or sections of the clip. The length of the flange, however, has a slightly longer dimension on the inside towards the opposite flange with the outside dimension being relatively short. A notch or groove is formed in the outside surface of each leg adjacent to the surface of the flange. This groove is sized to fit the thickness of the reinforcement strip. The outside and inside edges of each of the flanges formed on the legs of the clip are beveled in opposite directions so as to form a parallelogram in a side view of each flange. The inside edges of each of the corresponding flanges are beveled downward while the outside edges of the flanges are angled upward. As will be explained later the design and dimensions of the clip including the flanges are critical to the proper functioning of the retainer clip.

The flanges can be offset with respect to the legs of the clip by approximately eight degrees from the perpendicular with the inside edges of the flanges angled downward from the plane of the body.

Pairs of spaced apertures are formed across the reinforcing strip forming the spine of the binder and are spaced according to the width of the legs of the clip. The apertures are sized to approximate one half of the cross sectional dimensions of the legs and flanged feet of the clip.

In use one leg along with its corresponding flange is threaded through one of the apertures in the reinforcement strip with the leg and a portion of the body inserted through the strip before it is permanently installed on the binder. The sleeves which are to be retained within the binder are threaded over the exposed leg of the clip and the opposite leg and its corresponding flange is then inserted into its corresponding aperture. This later movement is accomplished by squeezing together the legs of the clip to allow the second leg to enter its corresponding aperture and to allow the flange to be inserted through the aperture. Upon release of the force holding the legs, the legs move outward, thus catching the spine strip material in the grooves on each side of the clip and securing the clip in the spine strip material. A continuous force attempting to push the legs of the clip away from each other is contained by the strip which causes the flange on each leg to be retained in its aperture and in a relatively flat plane which is parallel to the plane of the reinforcement strip. In this way a constant force is applied against the outside edges of the apertures which securely hold the clip in position. Once the clip and the sleeves are inserted and attached to the spine reinforcement strip, the strip is then sewn or permanently fastened to the spine or cover of the binder which permanently attaches the sleeves to the binder. The clips can be varied in size depending upon the width of the spine of the binder and the number of sleeves which are intended to be retained within the binder.

Another embodiment of the present invention includes a similar version in which the clip has an elongated inverted U-shaped configuration having an elongated body as well as opposing downwardly extending legs. The cross section of the clip can be either circular or formed in a rectangular cross section usually with the width of the cross section greater than its height. The ends of the legs of the clip can be beveled on each side with possibly a flat or curved surface. Each end is bifurcated by forming an elongated cut or notch in the end of the each leg leaving the ends formed as a pair of downwardly extending fingers. An outwardly extending transverse notch is provided on the outer surface of each finger.

A mounting receptacle is provided which usually has a circular or rectangular cross section and an outwardly extending flange area at one end. The opposite end has a socket or aperture formed in the receptacle which substantially corresponds to the outside configuration of the bifurcated fingers of the clip. A lateral transverse hole is formed through the receptacle having a width at least as wide as the fingers of the clip. The upper edges of this transverse hole has flat surfaces or shoulders which are strategically located so as to engage the outwardly extending notches formed on the outside surface of each finger of the clip. As the end of the leg with the bifurcated fingers is inserted into the receptacle, the socket which is slightly narrower than the fingers causes the fingers to be forced inward as they pass into the socket producing a compression force which is partially relieved when the notches enter the transverse hole passing through the receptacle. Thus, the fingers expand outward allowing the notches to engage the shoulder surface and thus are held rigidly within the receptacle.

In use the receptacles are inserted from the back side of the spine, cover or spine reinforcement strip until the flange is in contact with the spine, cover, or strip. While the receptacles are supported, an end of the U-shaped clip is threaded through holes provided in the margin of the sleeves and the ends of the clips are inserted into the receptacles and forced downwardly until the notches on each finger engage the shoulder or latch surface within the receptacle. In this fashion the ends of the clips are permanently secured within the receptacle. The reinforcement strip is then firmly attached to the spine or cover of the binder by either sewing or some other suitable securing device. In this way, the receptacles are held permanently within the binder. The sleeves are also permanently attached and retained within the binder by the clips. Additional permanency in this arrangement can be provided by plugging each side of each receptacle to make the fingers inaccessible so that the retainer clip is permanently locked in the binder.

The retainer clip in this embodiment can be sized as desired in order to retain the number and size of sleeves that are anticipated. It is expected that the dimensions of the elongated body as well as the legs will be adjusted to provide the necessary strength and rigidity for the retention of the number of sleeves that are intended for the specific binder.

In accordance with the present invention, sleeves are held in a stacked arrangement within the binder. Once the wallet or binder is opened, the sleeves can be moved from one side to the other to readily expose the contained discs and to make them available for use. This arrangement allows the easy movement of the sleeves along the body of the retainer clip without any restriction in the movement of the sleeves from one side to the other. In addition, the dimensions of the clip are designed to provide adequate strength in conjunction with the apertures formed in the edge of the sleeves to prevent tearing and intentional or accidental removal of the sleeves from the binder.

Several embodiments of the present invention have been described but it is to be understood that other aspects and features of the invention may become apparent from the following detailed description of the invention when it is considered in conjunction with the accompanying drawings.

BRIEF DESCRIPTION OF THE DRAWINGS

FIG. 1 is a perspective view of the enclosed binder for storing compact discs and the like;

FIG. 3 is a side elevation view showing a retainer clip according to the present invention;

FIG. 4 is a bottom perspective view of the clip;

FIG. 5 is a top perspective view of the clip;

FIG. 6 is a perspective view of a flanged receptacle corresponding to the retainer clip of FIG. 3;

FIG. 7 is a reversed perspective view of the receptacle shown in FIG. 6;

FIG. 8 is a side cross sectional view taken along lines 8—8 of FIG. 7;

FIG. 9 is a cross sectional view taken along the lines 9—9 of FIG. 7;

FIG. 10 is an exploded view of the spine reinforcing strip and the positioning of the receptacles;

FIG. 11 is a perspective view showing the completed installation of the receptacles in the spine of the binder;

FIG. 12 is a perspective view of a sleeve having multiple pockets for protecting compact discs;

FIG. 13 is a perspective assembly view showing a plurality of sleeves to be retained by the clips in the spine of the binder;

FIG. 14 is a perspective view showing the sleeves and clips permanently attached to the spine of the binder;

FIG. 15 is a partial cross sectional view taken along lines 15—15 of FIG. 14;

FIG. 20 is a perspective view of an enclosed compact disc wallet according to the present invention;

FIG. 21 is a perspective view of the open wallet showing the storage sleeves mounted to the spine of the wallet by retainer clips according to the present invention;

FIGS. 26–27 are perspective views showing the position of the flanged clip with respect to the spine reinforcement strip of FIG. 24;

FIG. 28 shows a perspective view of the initial installation of the flanged clip in the reinforcement strip;

FIG. 29 is a perspective view showing the insertion of a flanged foot through an aperture in the reinforcement strip;

FIGS. 33–34 are perspective views showing the insertion of the clip through an aperture in the reinforcement strip;

FIG. 35 is a perspective view of a sleeve for insertion in a binder;

FIG. 36 is a pictorial perspective view showing the threading of a plurality of sleeves on the clips partially inserted through said reinforcement strip.

DETAILED DESCRIPTION OF THE INVENTION

Figure 1:
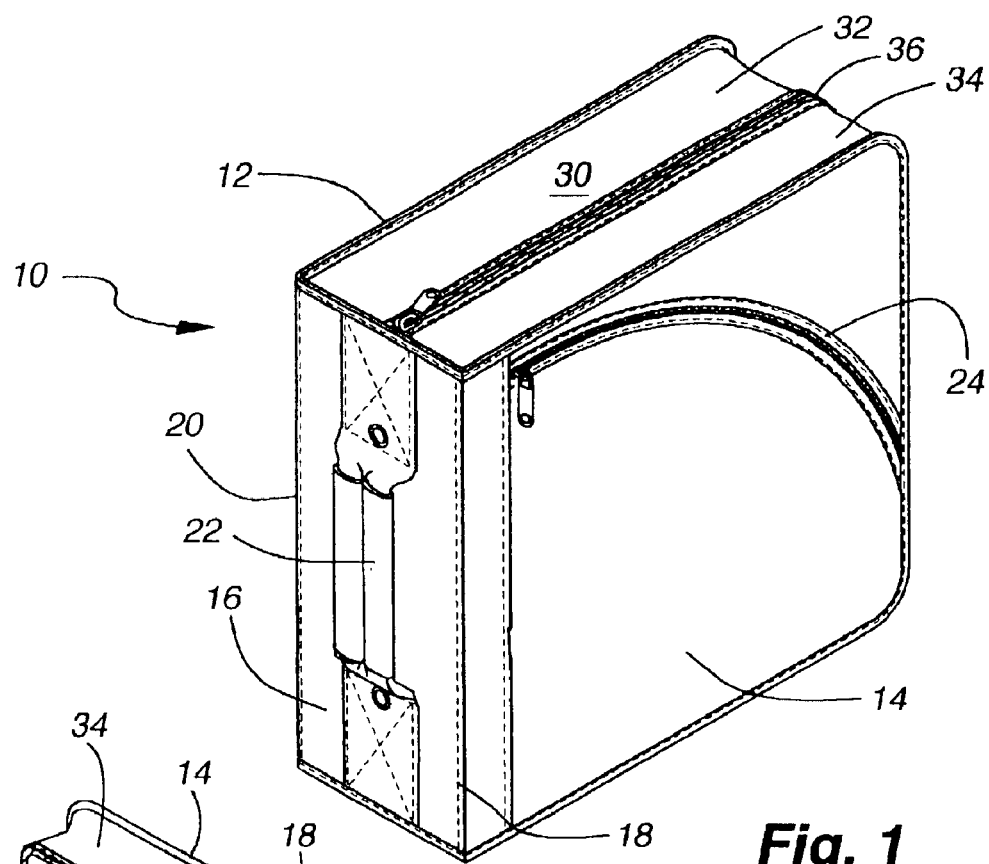
Figure 2:
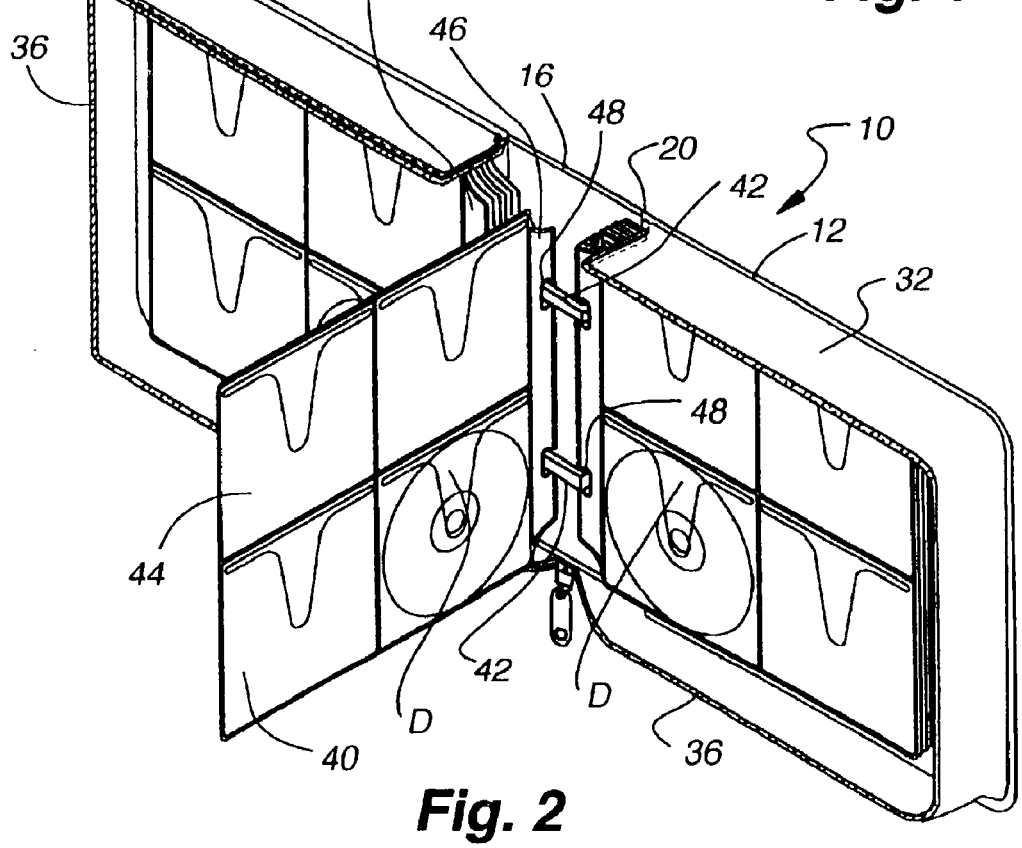
FIG. 2 shows the binder of FIG. 1 in another perspective view and shows the compact disc protective sleeves attached to the spine of the binder by the retainer clips according to the present invention.
Figure 17:
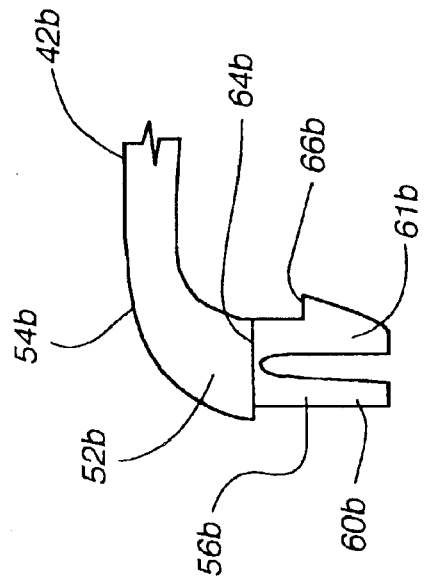
FIG. 17 is another embodiment of the coupling device.
Figure 19:
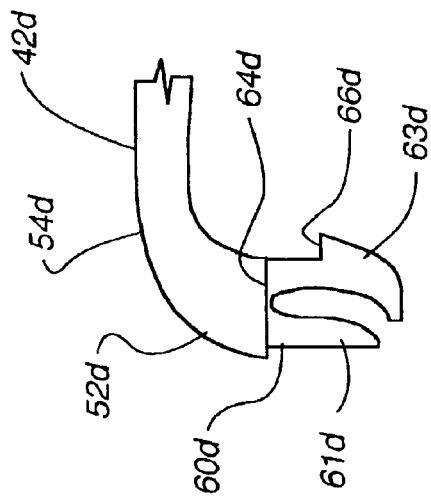
FIG. 19 is another embodiment of the coupling device according to the present invention.

Turning now more specifically to the drawings, FIGS. 1 and 2 show a storage device 10 which is intended for transportation and storage of disc type items. The disc type items that are contemplated for this type of storage can be phonograph records, compact discs both audio and CDRom as well as DVD discs. The storage device 10 can have the appearance of a notebook type binder having a front cover 14, a back cover 12, and a spine intermediate section 16. The transition between the covers 12, 14 and the spine section 16 can be a hinge, a living hinge or a fold line 18, 20. A suitable handle 22 can be attached to the outer surface of the spine section 16 for ease in carrying the storage device 10. A zipper type fastener 24 can be provided on the outside surface of the front cover 14 either to allow access to a pocket formed in the front cover 14 or to permit access to the interior of the storage device 10 in order to allow access to the interior contents, such as compact discs or DVD's.

An outer enclosure 30 usually formed from fabric has halves 32, 34 sewn on the outer perimeter edges of the inside of covers 14, 12 and connected by zipper 36 providing closure for the storage device 10 to secure the notebook type binder and to prevent damage or loss of its contents.

Throughout this application the storage device will, in most cases, be illustrated as a notebook type binder which can be adjusted in size to provide storage for the disc items that are desired. This is to say that the storage device can be relatively large similar to a common notebook which has been used in the past to store and bind sheets of material such as paper sometimes referred to as leaves. In the present instance the storage device is intended to contain a plurality of sleeves which are attached by apertures formed in the edge or margin of the sleeves to retainer clips 42 which attach the sleeves to the spine section 16 of the storage device 10. Although storage devices in many cases have utilized a loose leaf type ring device for attaching the sleeves to the binder, the present invention is directed to a unique arrangement for permanently attaching the sleeves to the binder.

As shown in FIG. 2 the sleeves can be formed from transparent or opaque flexible plastic sheet material and can be strategically heat welded with two or three layers of material forming pockets within the sleeve. The sleeves through various arrangements can be designed to hold and retain various size discs such as the standard compact disc and DVD disc in a plurality of pockets 44 on one or both sides of each sleeve 40. The sleeves are sized according to the size of the discs intended to be stored which in turn determines the size of the covers and spine section of the storage device or binder 10. The actual number of sleeves that are contained within the binder 10 can be easily determined and the width of the spine section 16 can be adjusted accordingly to accommodate this number. At the same time that the spine section 16 is adjusted, the length of the retainer clips 42 can also be adjusted to accommodate the number of sleeves that are intended.

The inside edge or margin 46 of the sleeve 40 can be reinforced with added thicknesses of the sheet material making up the sleeve and a plurality of apertures 48 are spaced along the margin 46 for attachment to the retainer clips 42.

The present invention is primarily directed to retainer clips for securing the sleeves within the binder 10 on a permanent or semi-permanent basis. In one preferred embodiment as shown in FIG. 3 the retainer clip 42 includes legs 50, 52 and elongated body 54, making up an inverted U-shaped clip 42. It is understood that the height or length of the legs 50, 52 as well as the length of the body 54 is designed to accommodate the number and size of sleeves 40 that will be retained within the storage device or binder 40. At the end of each leg 50, 52 is a coupling device 56.

The coupling device 56 in this embodiment is made up of at least two bifurcated fingers 58, 60 which extend outward from the end 62 of the legs 50, 52. A base surface 62, 64 is provided at the transition area between the legs 50, 52 and each respective coupling device 56. A notch 66, 68 is provided on the outer surface of each of the coupling device fingers 58, 60. The notch on each of the fingers 58, 60 is spaced outward a predetermined distance from the base surface 62, 64, respectively.

The other portion of the retainer clip 42 is a box-like receptacle 70 which is adapted to receive the coupling device 56 on the legs of the U-shaped portion of the retainer clip 42. The receptacle 70 is made up of a body section 72 and a flange section 74 which extends along one end and beyond the outer dimensions of the body section. The body section 72 has a rectangular hole or socket 76. The socket 76 extends entirely through the body section 72 of the receptacle 70. The dimensions of the socket 76 are sized to receive the bifurcated coupling 56 formed on the legs of the retainer clip 42. A transverse slot 80 extends through the body 72 so as to intersect the socket 76. The intersection of the slot 80 and the socket 76 forms a shoulder or ledge 82 on each side of the socket 76.

The width and the length of the socket 76 is sized to fit the length of the coupling device 56 but is slightly less than the width across the bifurcated fingers 58, 60. The spacing of the transverse slot 80 from the outer surface 84 of the body member 72 is sized to be slightly less than the distance between the base surface 64 and the notches 66, 68 formed in the bifurcated fingers 58, 60 of the coupling 56.

In use the coupling device 56 on the end 62 of the legs 50, 52 of the retainer clip are inserted through the socket 76 formed in the receptacle 70. The insertion of the coupling device 56 into the receptacle 70 causes the sides of the fingers 58, 60 to be forced inward toward each other to fit the socket opening 76. When the base surface 64 contacts the front surface 84 of the receptacle 70 the notches 66, 68 extend slightly past the flat shoulder 82 allowing the fingers to expand outward causing the notches 66, 68 to lock behind the shoulder 82. In this way once the retainer clip 42 is fully inserted into the receptacle 70, it becomes locked and securely fastened in the receptacle 70.

On the opposite end of the receptacle body 72 from the front surface 84 is the outwardly extending perimeter flange 74. The flange 74 extends approximately an eighth to a quarter of an inch beyond the outside periphery of the body 72 to provide a rigid support surface.

As seen in FIGS. 10 and 11, the receptacles 70 can be attached to the spine section 16 of the binder 10. A reinforcement strip 86 is formed from a relatively rigid sheet material such as metal, plastic, fiberboard or vinyl and has at least one pair of holes or apertures 86 located in the strip. These apertures 86 are spaced transverse to the longitudinal dimension of the strip and each pair is positioned along this dimension for each of the retainer clips 42 that will be used. The receptacles 70 are inserted through the apertures from the rear of the relatively rigid reinforcement strip 86. The strip 86 is then securely fastened to the inner surface of the spine 16 or a cover 12, 14 by any suitable fashion such as sewing or suitable adhesives. A transverse slit 88 is provided in the reinforcement strip 86 near its lower edge. The ends of the zipper portion of the enclosure halves 32, 34 along with the ends of zipper 36 are fed through this slot and anchored.

By using the separate receptacles 70 in conjunction with the construction of the covers 12, 14 or spine area 16 the finished construction of the binder 10 can be completed prior to the installation of the retainer clip 42 and sleeves 40. In this way the number of sleeves intended to be inserted in each individual binder can be customized by using retainer clips which have various lengths in the leg and/or body areas to accommodate the desired number of intended sleeves.

FIG. 14 shows the assembly of the plurality of sleeves 40 with a pair of retainer clips 42 threaded through the apertures 48 on the margins 46 of the sleeves 40. With the sleeves 40 positioned along the body portion 54 of the retainer clips 42 the coupling ends 56 are inserted into the sockets 76 provided in the receptacles 70. The retainer clips with their coupling ends are fully inserted so that the coupling devices 56 are locked securely into the receptacles 70. With both clips 42 securely fastened to the storage device or binder 10 the sleeves 40 are secured within the binder 10. With the binder enclosure zipper 36 closed around the perimeter of the front and back covers 12, 14, the discs contained therein are protected from damage to their surfaces as well as from loss.

It is to be understood that any suitable materials can be used in the fabrication of the storage binder 10 including the front and back covers 12 and 14 as well as the spine section 16. It has been found in the past that leather, fabric, vinyl or other plastics can be suitably used for this purpose. A second sheet of semi-rigid material such as fiberboard or plastic can be sewn on the inside surfaces of the covers and spine to provide added stiffness and reinforcement. In addition, the reinforcement strip 84 used to mount the retainer clips 42 to the binder can be fabricated from an even thicker and more rigid material than is contemplated for the covers. The closure device around the outside edges of the cover is usually a fabric material suitable for this purpose. A metal or plastic zipper can be used in conjunction with the enclosure halves in order to close the binder to prevent loss of the discs during transportation.

Figure 16:
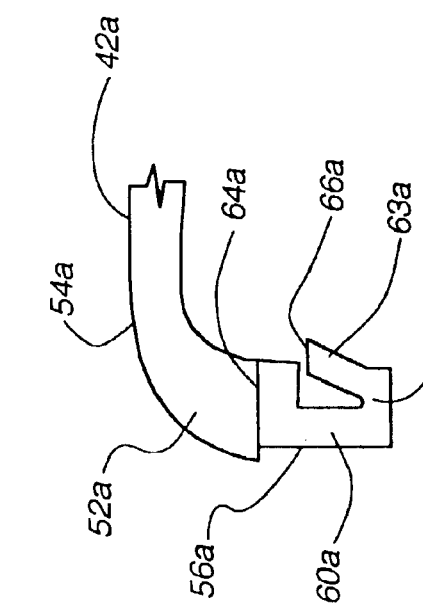
FIG. 16 is a side view showing a variation of the receptacle coupling device for the retainer clip according to the present invention.
Figure 18:
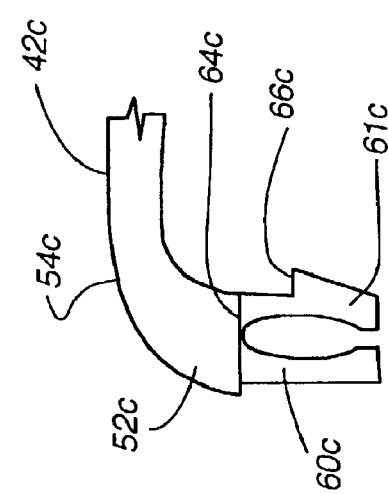
FIG. 18 is another embodiment of the coupling device.

FIGS. 16–19 show additional variations that can be provided for the coupling device 56 which is formed on the ends 62 of the legs 50, 52 of the fastener clips 42. FIG. 16 shows an embodiment of the coupling device 56a which has a downward extension 60a with a bottom return 61a and an outwardly extending tongue 63a. The outwardly extending tongue includes the notch or latch 66a which protrudes beyond the outside dimensions of the coupling device 56a. Upon insertion of the coupling device 56a, the tongue 63a will be depressed until it extends beyond the shoulder or ledge 82 provided in the receptacle 70. At that point the resiliency of the material allows the tongue to expand outward so that the notch area 66a is secured behind the shoulder 82.

In the same way, the coupling device 56b includes a downward extending finger 60b which is bifurcated with a similar finger 61b. The side of the finger 61b includes the notch or latch 66b which engages the shoulder 82 provided on the inside of the receptacle 70.

The coupling device 60c also includes downwardly extending bifurcated fingers with the finger 61c including the notch 66c. Again, the finger 61c is forced inwardly during insertion into the receptacle 70 until the finger 61c is released with the notch 66c extending outward to engage the shoulder 82 in the receptacle.

The coupling device 60d also includes the downwardly extending fingers 61d and 63d which are bifurcated which provide a space therebetween. The outer surface of the finger 63d is curved to permit the coupling device to be easily inserted into the socket 72 provided in the receptacle 70. Again, the notch 66d is provided on the outside surface of the finger 63d and is intended to engage the shoulder 82 provided on the inside of the receptacle 70. It is to be understood that any one of these designs or any similar design which would be suitable for the intended purpose will be considered part of the present invention.

FIGS. 20 and 21 show another embodiment of a storage device or binder 110 having a front cover 112, back cover 114, and a spine 116. The spine 116 being the intermediate or linking section connecting the front and back covers 112, 114. The covers 112, 114 are connected through a mechanical hinge or a living hinge 116, 118 which joins the respective covers to the spine 116.

For the purpose of illustration the binder 110 is reduced in size somewhat depending upon the type of objects such as compact discs which are intended to be stored within the binder 110. In many cases this type of binder having this reduced size is commonly called a "compact disc wallet".

The binder 110 in the open position, as seen in FIG. 21, reveals a plurality of sleeves 140 each containing a pocket 144 in which a recording, compact disc or DVD can be inserted. The sleeves can be fabricated from a flexible, transparent or opaque plastic sheet material with a number of layers heat welded together to form the individual sleeve 140. A pocket 144 for a disc can be provided on one or both sides of the sleeve 140. The pocket is intended to protect the surface of the disc from becoming scratched or damaged during storage or transportation. Each sleeve 140 includes a margin 146 along one edge which has a plurality of apertures or holes 148. A retainer clip 142 is inserted through the apertures 148 provided in the margins 146. The fastener clips are attached to the covers 112, 114 or the spine 116 of the binder 110 in order to permanently or semi-permanently secure the sleeves 140 to the binder 110.

If desired, an enclosure device consisting of halves 132, 134 can be provided respectively around the outside perimeter and can be attached such as by sewing or fastening to the outside perimeter of the covers 112, 114, respectively. A zipper 136 provided along the inside edges of the enclosure halves 132, 134 can be used to close the binder 110 and thus secure and protect the sleeves 140 contained therein.

The retainer clips 142 have a unique design for securing the clips 142 to the spine 116. Even though the retainer clips 142 are described and illustrated in connection with a smaller wallet size binder 110 it is to be understood that these clips can be used with any size binder to accomplish the intended purpose. By the same token the retainer clips 42 which have been described previously can also be used with any binder which has a sufficient width in the spine area to accommodate the receptacles 70.

As seen in FIGS. 22–25 the retainer clip 142 has an elongated body 154 and downwardly extending legs 150, 152 forming essentially a flattened U-shaped configuration. As can be seen the body 154 and legs 150, 152 have essentially a rectangular cross section wherein the width of the member is substantially greater than the thickness. It also can be noted that the thickness of the legs 150, 152 can be slightly greater than the overall thickness of the body 154. The purpose for this thickness will be explained later.

The outer ends of the legs 150, 152 translate into a flanged foot area 156, 158, respectfully. Immediately above the transition between the flanged feet 156, 158 and the legs 150, 152, respectively, is formed a groove 160, 162 which extends completely across the width of the retainer clip 142 adjacent the outer surface of the foot areas 150, 152. The flanged foot 156 includes an inner flange 164 which ends in a downwardly angled leading edge 166 and an outer flange 168 ending in an upwardly angled trailing edge 170. On the leg 152 the flange foot 158 includes the inner flange 172 which ends in a downwardly angled leading edge 174 and an outer flange 176 ending in an upwardly angled or beveled trailing surface 178. It is to be noted that both of the flanged feet 156, 158 are angled downwardly towards the center portion of the retainer clip 142 at an angle Z of approximately 8 degrees. It is also noted that the dimension X is the distance between the inside surface of the grooves 160, 162 with the retainer clip 142 in the relaxed condition.

The retainer clip 142 can be formed as an integral unit and fabricated from a single piece of material such as metal, plastics or synthetic resin. On the other hand, it can be molded through a satisfactory molding process in a one-piece integral configuration. It is essential that a resilient material be used to fabricate the retainer clip 142 which allows the legs to be bent or compressed inwardly toward each other during installation. This bending or compression sets up a biasing force which attempts to move the legs outward to hold the retaining clip within the spine of the binder 110.

With respect to the dimensions of the flanged foot section of the retainer clip 142, the inner flange portion 164 of the foot 156 is approximately twice the length of the outer flange portion 168. It is intended that the fastener clip 142 will be inserted and retained in the reinforcement strip 184 and that a pair of holes or apertures 186 will be formed in the reinforcement strip 184 transverse to the longitudinal axis of the strip 184. As will be explained later, a plurality of pairs of apertures 186 can be provided in the reinforcement strip 184 and they are spaced a predetermined distance which will match the apertures 148 provided in the margin 146 of the sleeves 140.

Figure 24:
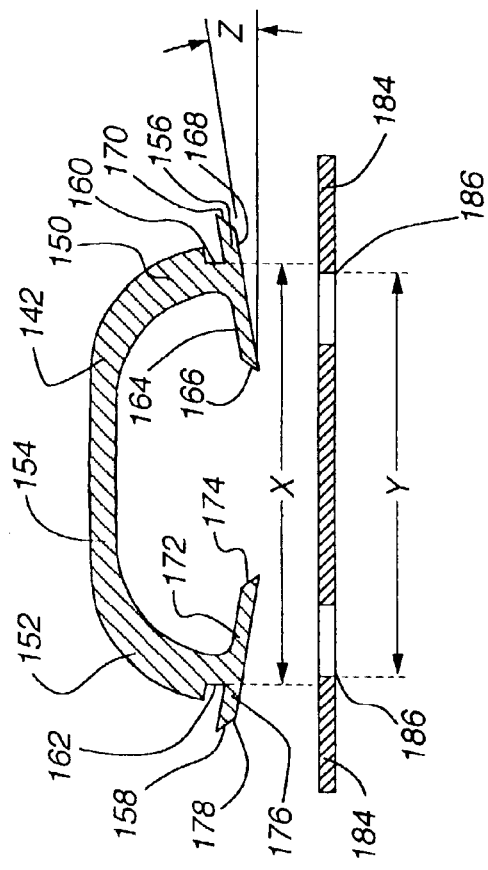
FIG. 24 is a cross sectional view of a flanged clip and the spine reinforcement strip.
Figure 25:
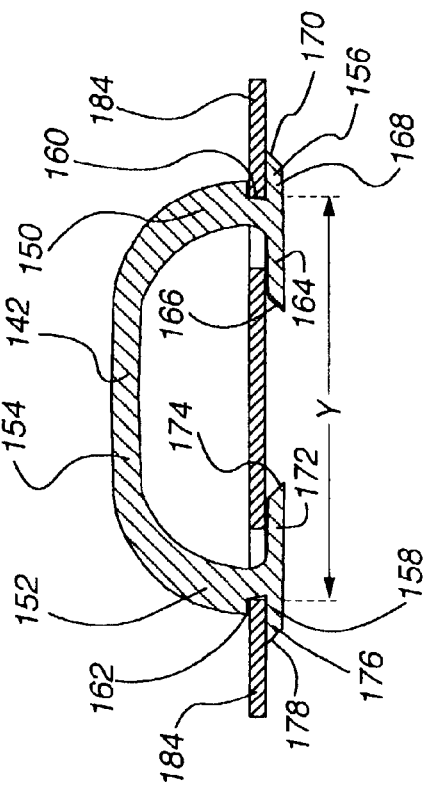
FIG. 25 is a cross sectional view showing the installation of the clip in the spine reinforcement strip.
Figure 22:
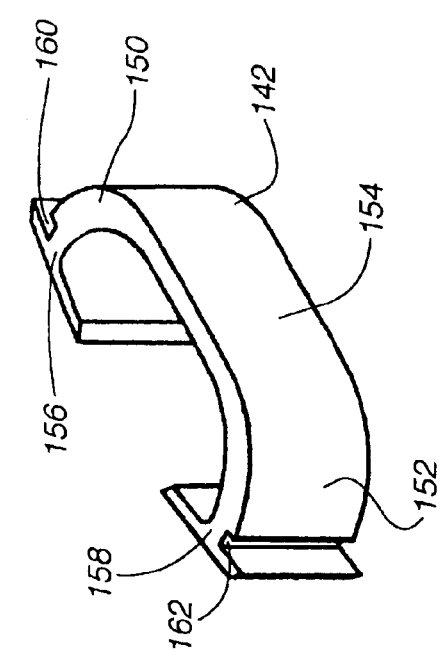
FIG. 22 is a perspective view of a clip having flanged feet according to the present invention.
Figure 23:
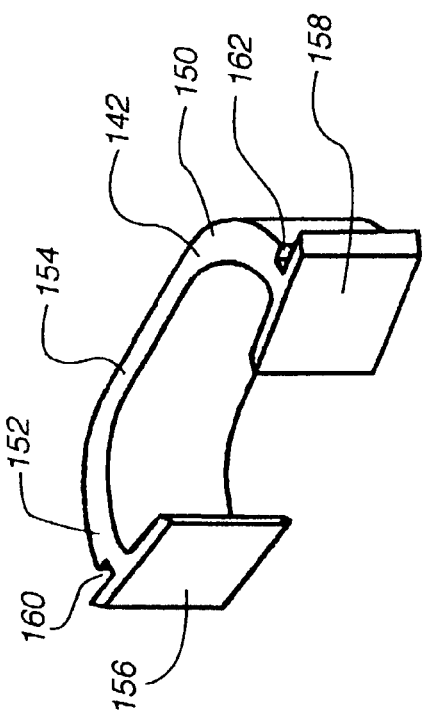
FIG. 23 is a perspective view showing the clip of FIG. 22 in a rolled over position.

As can be seen in FIG. 24 the dimension X which is the distance between the inside surface of the grooves 160, 162 is slightly greater than the distance between the outside edges of the pair of apertures 186 formed in the reinforcement strip 184. The apertures 186 have a width which is slightly greater than the width of the legs of the fastener clip 142 with the length of each hole slightly greater than the dimension between the trailing edge of the outer portion of the foot flange and a point on the inside surface of the corresponding leg of the clip 142. This allows the flanged foot on each end of the clip 142 to be properly installed and inserted into the corresponding pair of apertures 186 formed in the reinforcement strip 184.

To install the retainer clip 142 it is necessary for the legs 150, 152 to be forced inwardly toward each other with sufficient force to properly seat the flanged feet through the openings 186 in the reinforcement strip 184 with relaxation of the force on the legs allowing the legs to expand outward so that the grooves 160, 162, respectively, engage the outside edge of each of the corresponding pair of apertures 186. In this way, the retainer clip 142 is held in slight compression with the legs 150, 152 pushing outward so as to hold and retain the clip with the grooves secured in the reinforcement strip. At the same time this is accomplished the flanged feet on the ends of the legs are held generally flat against the under surface of the reinforcement strip 184 which prevents the flanged feet from being inadvertently released upward through the apertures 186 formed in the strip 184. Because the length of the apertures 186 formed in the reinforcement strip 184 are approximately one half of the length of each of the flanged feet, the actual installation of the retainer clip 142 is quite novel and will be explained later.

Figure 30:
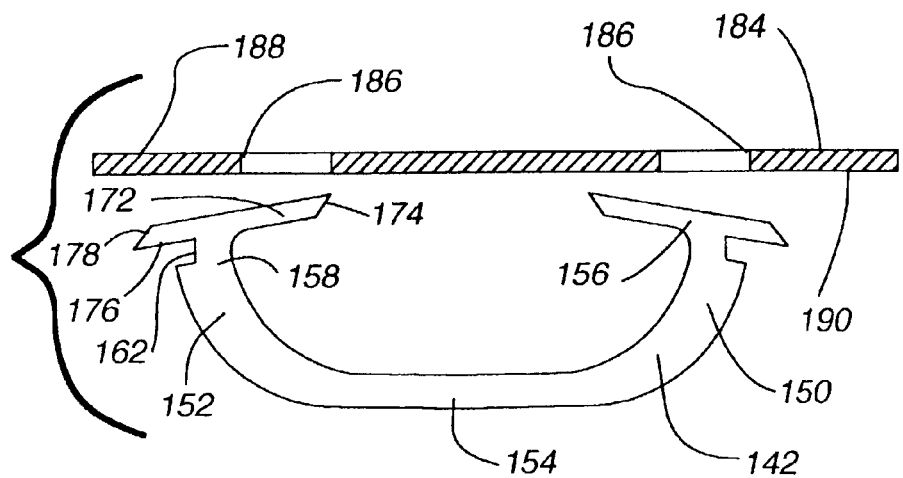
FIG. 30 is a cross sectional view taken along the lines 30—30 of FIG. 27.
Figure 31:
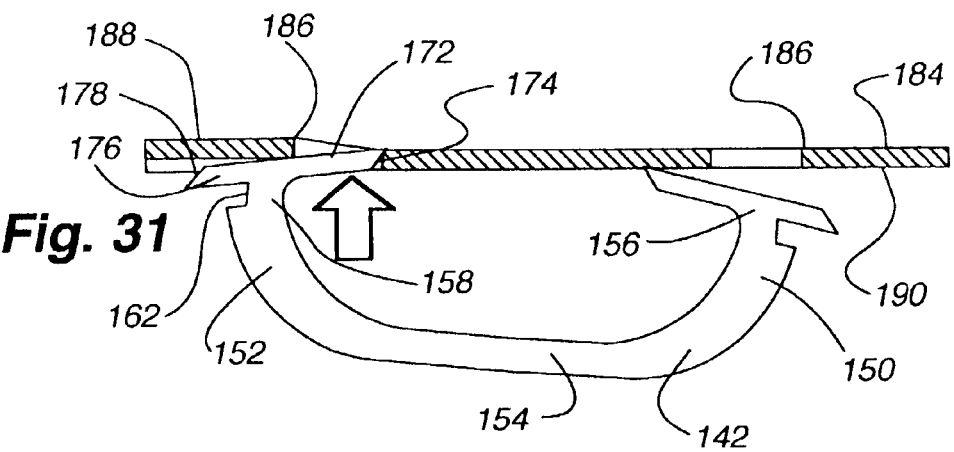
FIG. 31 is a cross sectional view taken along lines 31—31 of FIG. 28.
Figure 32:
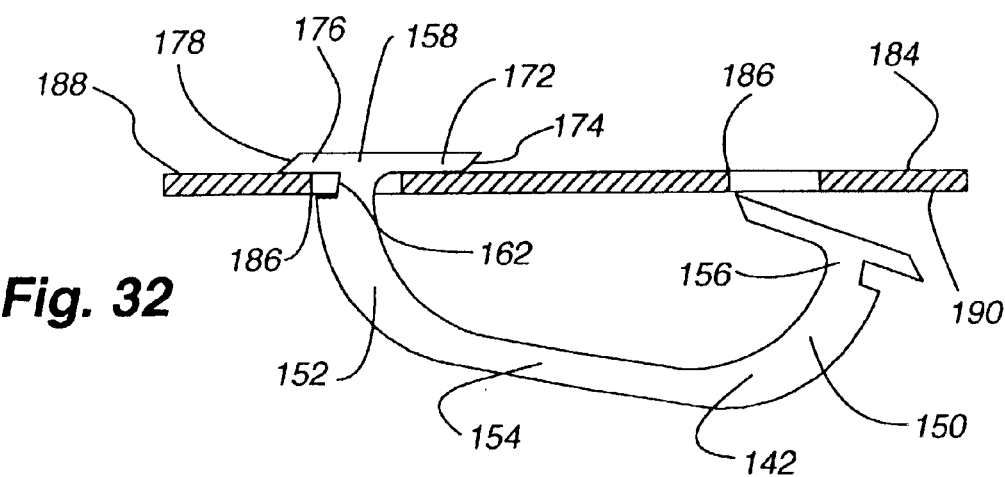
FIG. 32 is a cross sectional view taken along lines 32—32 of FIG. 29.
Figure 37:
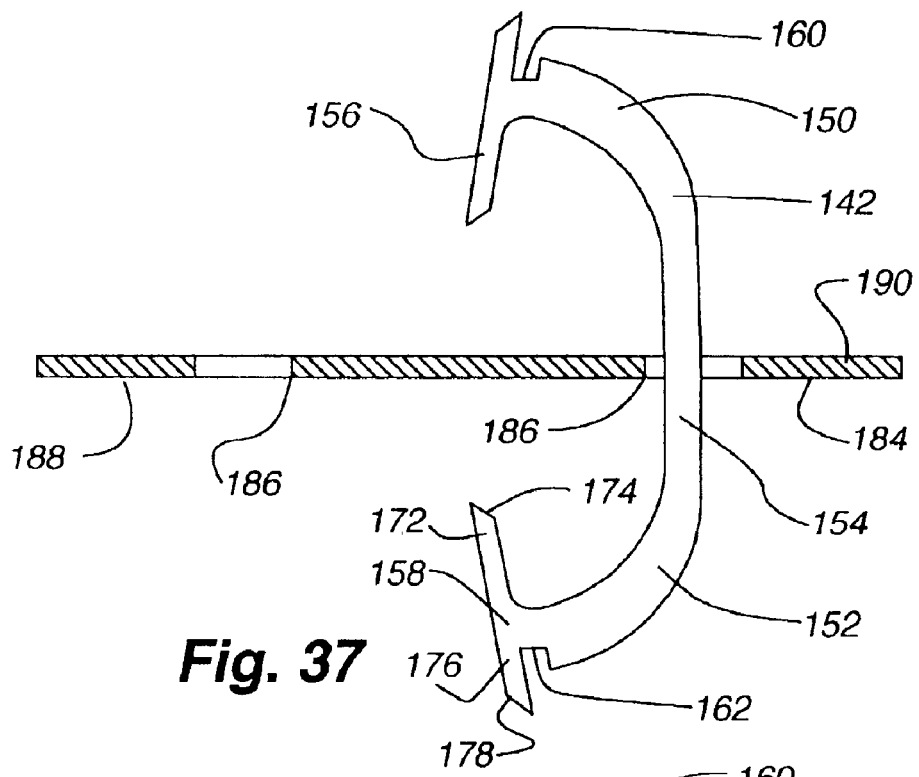
FIGS. 37–43 show a method of attaching the sleeves and the retainer clip according to the present invention to the spine reinforcement strip used in the binder.
Figure 38:
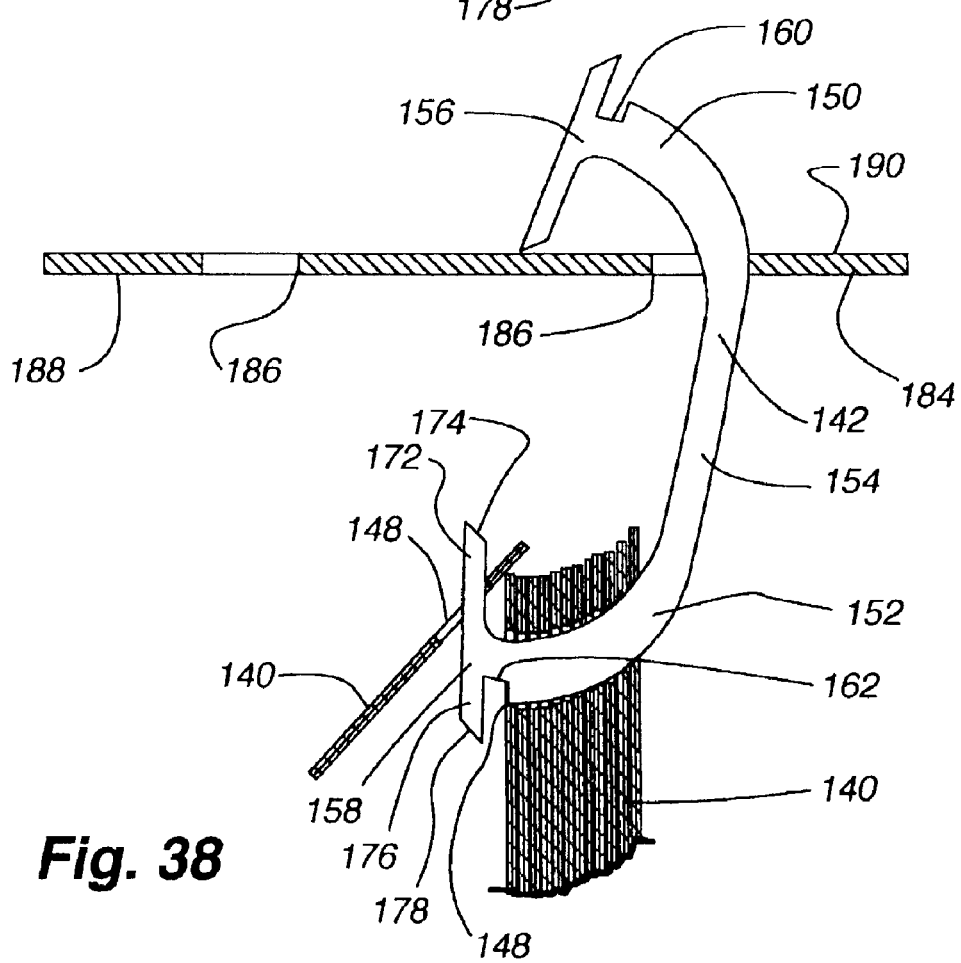
Figure 39:
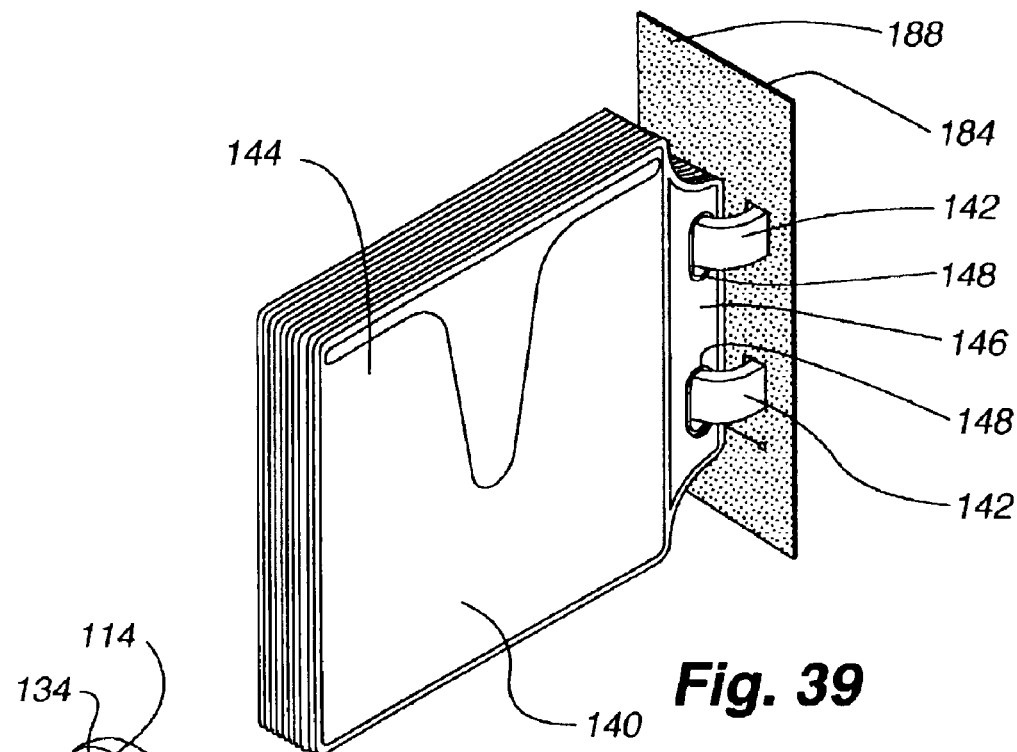
Figure 40:
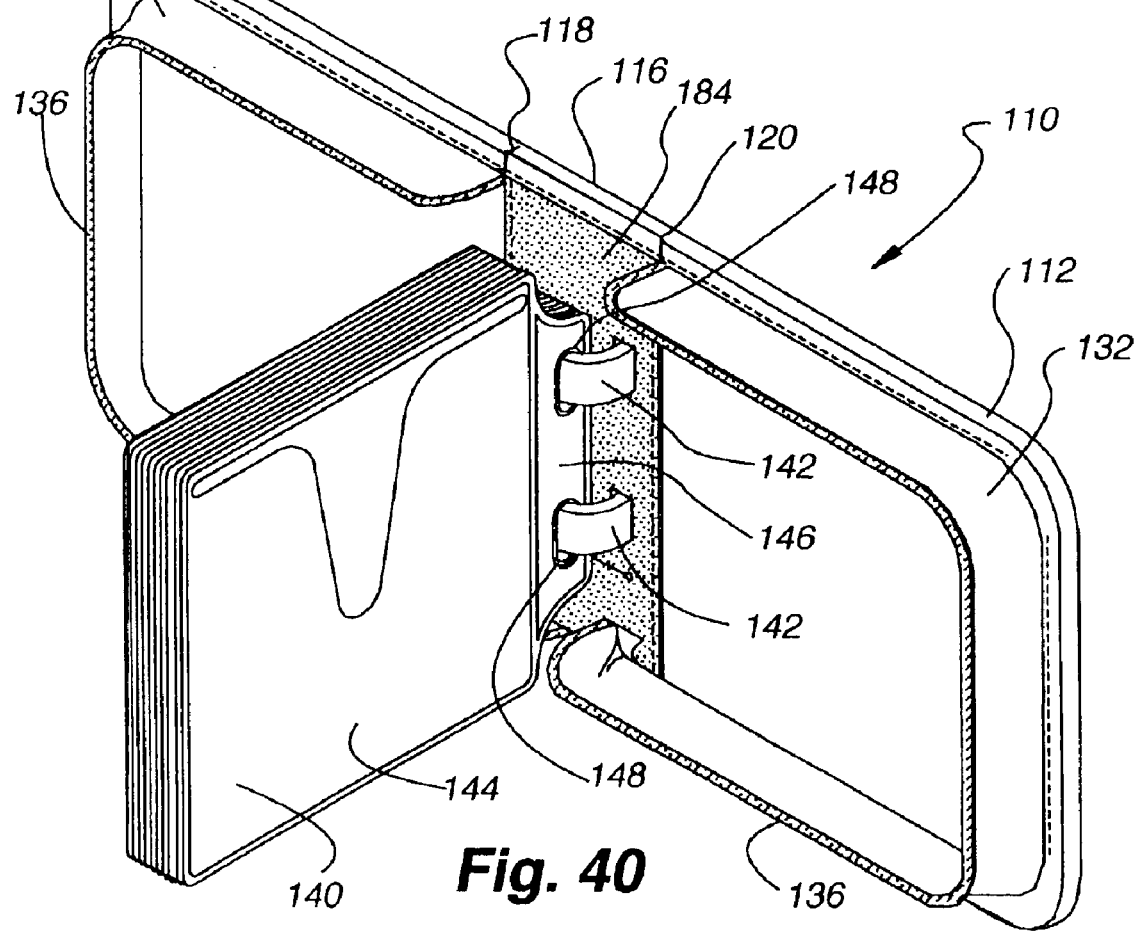

It is to be understood that the reinforcement strip 184 can be a separate piece of sheet material that is separate from the spine section 116 forming part of the storage binder 110. As seen in FIG. 26, the reinforcement strip 184 has an exposed finished surface 188 and an inner unfinished surface 190. In the interest of explanation, the individual steps for installation of the retainer clip 142 will be explained in conjunction with the corresponding figures. Thus, as can be readily seen, FIG. 27 is a perspective view which matches a cross sectional view of a reinforcement strip as shown in FIG. 30. In like token, FIGS. 28 and 31 correspond as well as FIGS. 29 and 32.

The first part of the installation causes the retainer clip 142 with its flanged feet 156, 158 to be placed in position adjacent to the inner unfinished surface 190 of the reinforcement strip 184. The left foot 158 as seen in FIG. 30 is positioned with the leading edge 174 of inner flange 172 positioned adjacent to the inside edge of the aperture 186 in the reinforcement strip 184. The leading edge 174 is then forced upwardly through the aperture 186 with the inner flange 172 of the foot 158 moved towards the right to align the inside surface of the leg 152 against the edge of the aperture 186 to allow the flange trailing edge 178 to pass through the aperture and place the flanged foot against the finished surface of the strip 184.

FIG. 33 shows the foot 158 exposed on the finished side 188 of the reinforcement strip 184. The retainer clip 142 is then pressed upwardly towards the finished surface 188 of the strip 184 so that the leg 152 and flanged foot 158 are partially extended through the opening 186. A second retainer clip 142 is also shown inserted through the lower apertures 186 in the reinforcement strip 184. At this point a plurality of sleeves 140 are individually threaded over the leading edge 174 of the inner flange 172 of the foot 158 of the retainer clip 142. The desired predetermined number of sleeves are inserted and are stacked on the inside leg portion 152 on each of the clips 142. Note that the strip 184 has now been turned over and the following steps are performed from the finished side of the strip.

Figure 41:
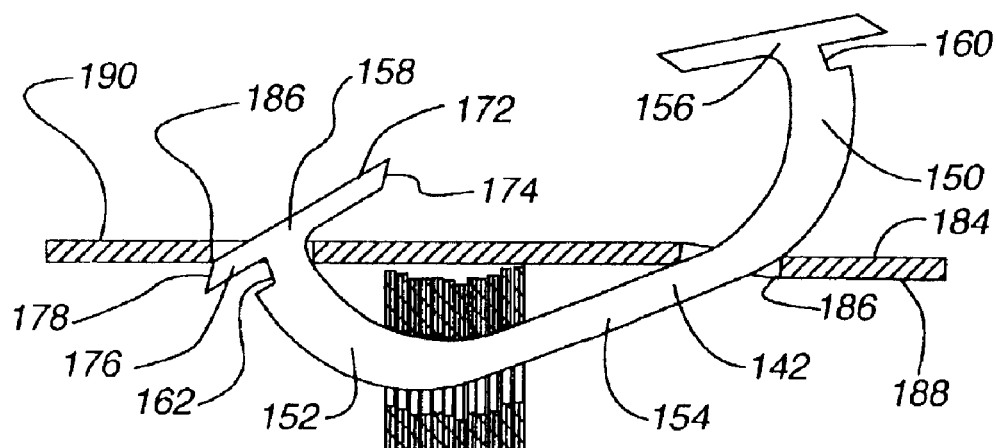
Figure 42:
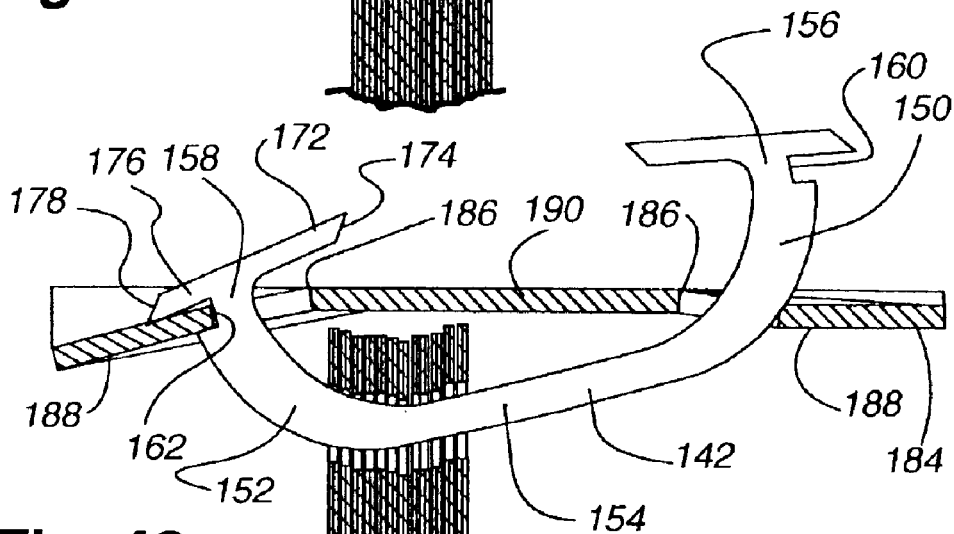
Figure 43:
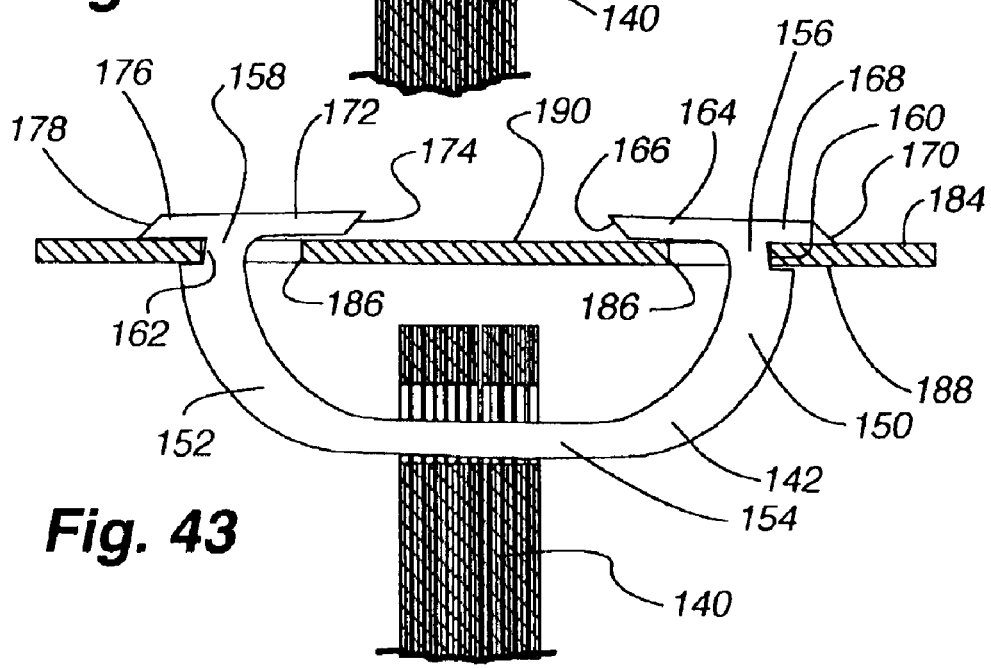

Once the proper number of sleeves 140 are installed, the flanged foot portion 158 of the retainer clip 142 is then moved upward as seen in FIG. 41 with the leading edge 174 of the inner flange 172 of the foot 158 moved upward through the second aperture 186 formed in the reinforcement strip 184. Upon complete insertion of the inner flange 172, the trailing edge 178 is then sufficiently clear of the back side of the opening 186 to allow the outer flange 176 of the foot 158 to be inserted upward through the aperture 186 so that the outer flange is now on the back side 190 of the strip 184 with the groove 162 engaged against the outside edge of the aperture 186. Pushing downward as illustrated in FIG. 42 on the opposite leg 150 of the retainer 142 causes the leg 150 to be forced downward and flexed to allow the leg to slide through the aperture 186 until the groove 160 engages the outside edge of the corresponding aperture 186. Once both grooves 160, 162 are secured along the outside edges of their respective openings 186, the outward force provided by the compression of the retainer clip 142 forces the legs 150, 152 outward slightly so that the grooves are permanently retained in the apertures. The flanged feet 156, 158 are held generally parallel to the reinforcement strip 184 and in contact with the inner unfinished surface 190 of the strip. In this configuration the retainer clip 142 extends outwardly from the finished surface 188 of the reinforcement strip 184 with the sleeves 140 securely attached.

With the sleeves 140 and the accompanying pair of retainer clips 142 securely attached to the reinforcement strip 184 the assembly is then fastened to the inside surface of the spine portion 116 of the binder 110. The reinforcement strip 184 can be attached to the inside of the spine by sewing or it can be glued to the spine by use of a suitable adhesive or it can be attached by the use of rivets. Rivets can be used in addition to other methods of attaching to permanently secure the elements in position.

When attaching the reinforcement strip 184 to the spine 116 the slit 192 permits the halves 132, 134 of the enclosure to be inserted and secured for anchoring the enclosure device and its accompanying zipper. Once these elements have been properly assembled and attached to the binder 110 the binder is complete with the installation of the sleeves 140 in conjunction with the novel retainer clips 142.

When the binder or wallet is opened and laid flat on a support surface, the sleeves 140 will lie flat on either cover of the binder 110. The relatively thicker portion of the retainer clip 142 in the areas of the legs 150, 152 holds the sleeves in a relatively firm position since the thickness of the leg portions of the retainer clip is only slightly less than the dimensions of the apertures 148 formed in the margin 146 of the sleeves 140. In this way the sleeves do not move when in a horizontal position but are still free to be moved onto the body portion where they can freely slide along the retainer clip to the opposite side. This arrangement facilitates the movement of the sleeves and provides a desirable feel to the positioning of the sleeves 140 within the binder when open and when the sleeves are moved from one side to the other.

During the discussions of the reinforcement strip, it was stated that there is a texture applied to the outer surface 188 of the strip 184 which is applied to improve the appearance of this surface. This surface finish can be printed, embossed or impressed upon the material making up the strip 184 and can have any design which is desired.

Again, it is understood that the retainer clips as described herein can be used in any size of storage device which can be the traditional binder type device or the wallet type device. Two embodiments of the retainer clip have been shown and described herein with the understanding that either one can be adapted and adjusted for various sizes of compact disc and DVD storage devices. It is also understood that the retainer clips described in this application can be used in any binder arrangement wherein it is intended to retain sleeves or other sheet material on a permanent or semi-permanent basis.

While this application discusses the use of a reinforcement strip as an attachment base for the retainer clips, it is to be understood that the covers or spine of the binder can be used as the reinforcement strip for this installation. In addition, while the present application describes the installation or attachment of the reinforcement strip to the inside of the spine of the binder, it is also possible as an alternative to attach the strip to either the front or rear cover near the spine area of the binder.

While an improved retainer clip for binders has been shown and described in detail, it is to be understood that various changes and modifications to the described embodiments may be achieved without departing from the spirit of the present invention.

I claim:

1. A retainer device for permanently securing sleeves in a binder for storing and protecting disc type objects, said sleeves having pockets for receiving said objects and one or more holes formed along a margin, the binder having front and rear covers and a spine intermediate said covers, the retainer device comprising:
   a) an inverted, U-shaped clip having an elongated body portion having opposed ends and a leg portion extending outwardly at an angle from each end of said body portion, each leg terminating in an outer end;
   b) a reinforcement strip formed from a substantially rigid sheet material, said strip being arranged for attachment to said binder;
   c) coupling means provided for attaching the outer end of said legs to said reinforcement strip, said coupling means being arranged to be permanently attached to said reinforcement strip after sleeves are inserted over the body portion of said clip so that when the reinforcement strip is securely attached to the binder the clip and sleeves cannot be removed and misplaced;
   d) said coupling means further includes at least one pair of spaced apertures formed in said reinforcement strip to receive and secure the legs of said clip; and
   e) said coupling means includes an outwardly extending rectangular flange portion which permanently secures the end of a leg in each of the apertures of said strip.

2. A retainer device as defined in claim 1 wherein the reinforcement strip is sized to fit the intermediate spine of said binder.

3. A retainer device as defined in claim 1, wherein the rectangular flanged portion forms an elongated flanged foot attached to the outer end of each of said legs, said elongated flanged foot having a longitudinal axis, the flanged foot contains an inner and outer flange and a transverse groove formed in an outer surface of the leg at the juncture between said foot and said leg, the longitudinal axis of each flanged foot is coplanar to a plane through the legs of said U-shaped clip.

4. A retainer device as defined in claim 3 wherein the legs have a predetermined width and the apertures formed in the reinforcement strip have a slightly larger dimension than the width of said legs with the length of the aperture approximately one-half of the length of said foot whereby the leg and foot of the clip can be positioned at an angle so that it can pass through and be positioned in the aperture with the foot on an opposite side of said strip from the leg and body portion of the clip.

5. A retainer device as defined in claim 3 wherein the U-shaped clip is formed from a resilient material which allows the legs to be biased toward each other and inserted through the apertures so that when the bias is removed an edge of an aperture engages each of the grooves on the legs of the clip to secure the clip in the reinforcement strip.

6. A retainer device as defined in claim 3 wherein each foot has a width which is the same as the corresponding leg and the outer flange has a trailing edge and the leg has an inner and outer surface, and the aperture in the reinforcement strip has a width which is slightly greater than the width of the foot while the length is slightly greater than the dimension between the trailing edge of the outer flange and the inner surface of the leg.

7. A method for permanently securing sleeves in a binder for storing and protecting objects contained within said sleeves, said sleeves being a generally flat sheet-like item having a margin along one edge and a plurality of securing holes formed within said margin, the binder having front and rear covers and a spine intermediate said covers, the method consisting of:
   a) forming an inverted U-shaped clip having an elongated body portion with opposing ends and a leg portion extending outwardly at an angle from each of the ends of said body portion; and
   b) forming a pair of apertures in a reinforcement strip formed from a substantially rigid sheet material, sizing said reinforcement strip to the approximate size of the spine of said binder, said apertures being spaced slightly less than equal to the space between the legs of said clip;
   c) forming a flanged foot on each of said legs, said flanged foot being arranged transverse to its respective leg and formed so that the flange is equal to the width of the leg with an inner flange portion approximately twice the length of an outer flange portion;
   d) inserting one foot and leg of the clip through one of said apertures;
   e) threading one or more sleeves through a hole in the margin of said sleeve onto the body portion of said clip;
   f) threading the same foot and leg of the clip through the second aperture so that the flanged foot is extended through said aperture;
   g) forcing the body portion of the clip away from said reinforcement strip so as to seat the second flanged foot against a surface of said strip; and
   h) attaching the reinforcement strip containing the clip and sleeves to said binder whereby the clip and sleeves are permanently retained within said binder.

8. A method for permanently securing sleeves within a binder as described in claim 7 which further includes the step of: forming a second pair of apertures in said reinforcement strip so that they are spaced from the first pair of apertures and threading a second clip through said second pair of apertures and said sleeves so as to secure a plurality of clips holding the sleeves.

9. A method for permanently securing sleeves within a binder for storing and protecting disc type objects, said sleeves having pockets for receiving said objects and a plurality of holes formed along a margin, said binder having front and rear covers and a spine intermediate said covers, the method for securing said sleeves consisting of:
   a) forming at least one inverted, U-shaped clip having an elongated body portion and having opposed ends and a pair of legs extending outward from said body ends in the same direction and forming a coupling device at an outward end of each leg;
   b) fabricating a flat reinforcement strip sized to fit said binder and having a pair of apertures which are located and sized to receive the legs of said clip;
   c) threading one or more sleeves over the body portion of said clip;
   d) securing the legs of said clip through the apertures of the reinforcement strip so as to secure the ends of the legs to said strip; and
   e) permanently fastening the reinforcement strip to said binder whereby the sleeves and clip will be permanently retained within said binder.

10. A method for securing sleeves in a binder as described in claim 9 wherein the coupling device is formed on the outer end of each leg of said clip, and forming a flanged receptacle adapted to receive and grip the coupling device, threading one leg of the clip through a hole formed in the margin of one or more sleeves, inserting a flanged receptacle through the strip apertures from one side of said reinforcement strip and inserting the coupling device on the end of each leg into said receptacles from the opposite side so that the legs are permanently secured in the receptacles, and attaching the reinforcement strip containing the clip and sleeves to said binder whereby the sleeves are permanently secured within said binder.

11. A method for permanently securing sleeves containing disc like objects in a binder, said binder having a front and back cover and an intermediate spine, said sleeves having one or more holes formed in a margin along one side, said method consisting of the following steps:
   a) forming an inverted U-shaped retainer clip having a central body section with opposed ends and a pair of legs extending outwardly from said body ends, each of said legs terminating in a transversely extending flanged foot, said flanged foot each having a width equal to the adjoining leg and an inner flange extending from said leg and toward the opposite leg with an outer flange extending from said leg in the opposite direction, said outer flange having a length which is less than the inner flange;
   b) forming a pair of spaced apertures in a reinforcement strip sized to equal the intermediate spine of said binder, said apertures being sized to have a width slightly greater than the width of said flanged foot and a length which is slightly greater than the dimension of the thickness of the leg and the outer flange of said foot;
   c) inserting a flanged foot through one of the apertures in said reinforcement strip and threading sleeves through their margin holes over the body portion of said clip;
   d) inserting the same foot through the second aperture so that the flanged foot extends slightly through the second aperture; and
   e) biasing the legs toward each other and forcing the body section of the clip away from the reinforcement strip so that both flanged feet are in contact with a surface of the reinforcement strip when the legs are released and permanently fastening the reinforcement strip containing the outwardly extending sleeves and dip to the spine of said binder whereby the sleeves are permanently retained within said binder.

12. A method for securing sleeves within a binder as described in claim 11 wherein a groove is formed on the outside surface of each of said legs adjacent to the corresponding flanged foot, and when the leg biasing is released the grooves engage an edge of each of the corresponding apertures so as to lock the clip in a secured position with the reinforcement strip.

13. A retainer assembly for permanently securing sleeves containing disc like objects in a binder, said binder having an intermediate spine, said retainer assembly comprising:
   a) one or more inverted U-shaped retainer clips each having an elongated body section having opposing ends and a leg extending outward in the same direction from each of said body ends, each of said legs terminating in an outwardly extending end;
   b) said intermediate spine being formed from a generally rigid, sheet like material having a pair of spaced apertures for each retainer clip;
   c) coupling means provided for attaching the ends of said legs to said intermediate spine, said coupling means being arranged to be fastened in said apertures in said spine so as to secure to said binder one or more sleeves threaded over said clips; and
   d) said coupling means further includes an outwardly extending rectangular flange portion which permanently secures the end of the legs of the retainer clips in the respective pair of apertures in said spine.

14. A retainer assembly for permanently securing sleeves in a binder as defined in claim 13 wherein the coupling means includes a coupling device formed on the end of each leg and a flanged receptacle arranged to receive said coupling device, a flanged receptacle is inserted through each of the apertures from one side of said spine with the body section of the clip positioned on an opposite side whereby when the sleeves are threaded over the clip and the clip is inserted into said flanged receptacles, the sleeves will be permanently secured in said binder.

15. A retainer assembly as defined in claim 14 wherein the coupling device has a pair of bifurcated fingers with a notch provided on an outside surface of at least one of said fingers and a shoulder is provided within said flanged receptacle whereby when the coupling device is inserted into said receptacle the notch is locked against the shoulder of said receptacle.

16. A retainer assembly for permanently securing sleeves in a binder as defined in claim 13 wherein:
   a) the coupling means includes a transversely extending flanged foot formed on the end of each leg, said flanged foot having an inner flange extending towards the opposite leg and an opposite outer flange, said inner flange having a length greater than the outer flange; and
   b) the spine apertures are sized to have a length which is slightly greater than the length of the outer flange and the width of the attached leg whereby the flanged foot can be inserted through said spine aperture so that when sleeves are threaded over said clip and both flanged feet are inserted through the spine apertures the sleeves will be permanently retained within said binder.

17. A retainer assembly as defined in claim 16 wherein a groove is formed on an outside surface of each leg at the juncture of the flanged foot and the groove engages an edge of a spine aperture when the clip is installed in the spine.

18. A retainer assembly as defined in claim 17 wherein the clip is formed from a resilient material and the space between the spine apertures is slightly less than the space between the legs so that the legs must be biased toward each other during installation of the clip producing a residual outward force by the legs further seating the grooves in the apertures to lock the clip and sleeves in the spine of the binder.

19. A retainer device for permanently securing sleeves in a binder for storing and protecting disc-type objects, said sleeves having pockets for receiving said objects and one or more holes formed along a margin, the binder having front and rear covers and a spine intermediate said binders, the retainer device comprising:
   a) an inverted, U-shaped clip having an elongated body portion having opposed ends and a leg portion extending outwardly at an angle from each end of said body portion, each leg terminating in an outer end;
   b) a reinforcement strip formed from a substantially rigid sheet material, said strip arranged for attachment to said binder;
   c) coupling means provided for attaching the outer end of said legs to said reinforcement strip, said coupling means being arranged to be permanently attached to said reinforcement strip after sleeves are inserted over the body portion of said clip so that when the reinforcement strip is securely attached to the binder the clip and sleeves can not be removed and misplaced;
   d) the coupling means includes at least one pair of spaced apertures formed in said reinforcement strip to receive and secure the legs of said clip; and
   e) the coupling means further includes a pair of bifurcated fingers extending from the end of each leg and a flanged receptacle sized to receive said bifurcated fingers, the flanged receptacle being secured in each strip aperture, an outside surface of at least one finger having a notch which is adapted to fit a shoulder surface formed in said receptacle whereby each leg of the clip can be permanently secured within an installed receptacle.

20. A retainer device as defined in claim 19 wherein the space between said apertures is identical to the spacing between the legs of said clip, and the flanged receptacles are inserted through the apertures in said reinforcement strip whereby the flange is held in contact with one side of the strip while the legs of the clip are inserted into the receptacle from the opposite side of said strip.

21. A retainer device as defined in claim 19 wherein an outside surface of each bifurcated finger is rounded and includes a notch with each receptacle including a corresponding shoulder surface for receiving said notch for permanently locking the clip to the receptacle.

22. A retainer device for permanently securing sleeves in a binder for storing and protecting disc-type objects, said sleeves having pockets for receiving said objects and one or more holes formed along a margin, the binder having front and rear covers and a spine intermediate said covers, the retainer device comprising:
   a) an inverted, U-shaped clip having an elongated body portion having exposed ends and a leg portion extending outwardly at an angle from each end of said body portion, each leg terminating in an outer end;
   b) a reinforcement strip formed from a substantially rigid sheet material, said strip being arranged for attachment to said binder;

c) coupling means provided for attaching the outer end of said legs to said reinforcement strip, said coupling means being arranged to be permanently attached to said reinforcement strip after sleeves are inserted over the body portion of said clip so that when the reinforcement strip is securely attached to the binder the clip and sleeves can not be removed and misplaced;

d) said coupling means includes at least one pair of spaced apertures formed in said reinforcement strip to receive and secure the legs of said clip;

e) said coupling means further includes a flanged foot attached to the outer end of each of said legs, the flanged foot contains an inner and outer flange and a transverse groove formed in an outer surface of the leg at the juncture between said foot and said leg; and f) the legs of said U-shaped clip have a predetermined spacing and the apertures formed in the reinforcement strip have a slightly larger dimension than the space between said legs with the length of the aperture approximately one-half of the length of said foot whereby the leg and foot of the clip can be positioned at an angle so that it can pass through and be positioned in the aperture with the foot on an opposite side of said strip from the leg and body portion of the clip.

23. A retainer device for permanently securing sleeves in a binder for storing and protecting disc-type objects, said sleeves having pockets for receiving said objects and one or more holes formed along a margin, the binder having front and rear covers and a spine intermediate said covers, the retainer device comprising:

a) an inverted, U-shaped clip having an elongated body portion having exposed ends and a leg portion extending outwardly at an angle from each end of said body portion, each leg terminating in an outer end;

b) a reinforcement strip formed from a substantially rigid sheet material, said strip being arranged for attachment to said binder;

c) coupling means provided for attaching the outer end of said legs to said reinforcement strip, said coupling means being arranged to be permanently attached to said reinforcement strip after sleeves are inserted over the body portion of said clip so that when the reinforcement strip is securely attached to the binder the clip and sleeves can not be removed and misplaced;

d) said coupling means includes at least one pair of spaced apertures formed in said reinforcement strip to receive and secure the legs of said clip;

e) said coupling means further includes a flanged foot attached to the outer end of each of said legs, the flanged foot contains an inner and outer flange and a transverse groove formed in an outer surface of the leg at the juncture between said foot and said leg; and f) the U-shaped clip is formed from resilient material which allows the legs to be biased toward each other and inserted through the apertures so that when the bias is removed an edge of an aperture engages each of the grooves on the legs of the clip to secure the clip in the reinforcement strip.

24. A retainer device for permanently securing sleeves in a binder for storing and protecting disc-type objects, said sleeves having pockets for receiving said objects and one or more holes formed along a margin, the binder having front and rear covers and a spine intermediate said covers, the retainer device comprising:

a) an inverted, U-shaped clip having an elongated body portion having exposed ends and a leg portion extending outwardly at an angle from each end of said body portion, each leg terminating in an outer end;

b) a reinforcement strip formed from a substantially rigid sheet material, said strip being arranged for attachment to said binder;

c) coupling means provided for attaching the outer end of said legs to said reinforcement strip, said coupling means being arranged to be permanently attached to said reinforcement strip after sleeves are inserted over the body portion of said clip so that when the reinforcement strip is securely attached to the binder the clip and sleeves can not be removed and misplaced;

d) said coupling means includes at least one pair of spaced apertures formed in said reinforcement strip to receive and secure the legs of said clip;

e) said coupling means further includes a flanged foot attached to the outer end of each of said legs, the flanged foot contains an inner and outer flange and a transverse groove formed in an outer surface of the leg at the juncture between said foot and said leg; and f) each foot has a width which is the same as the corresponding leg and the outer flange has a trailing edge and the leg has an inner and outer surface, the aperture in the reinforcement strip has a width which is slightly greater than the width of the foot while the length of the aperture is slightly greater than the dimension between the trailing edge of the outer flange and the inner surface of the leg.

25. A retainer assembly for permanently securing sleeves containing disc-like objects in a binder, said binder having a front and back cover and an intermediate spine, said retainer clip assembly comprising:

a) an inverted U-shaped retainer clip having a body section having opposing ends and a leg extending outward in the same direction from each of said body ends, each of said legs terminating in an outwardly extending end;

b) said intermediate spine being formed from a generally rigid, sheet-like material having at least one pair of spaced apertures;

c) coupling means provided for attaching the ends of said legs to said reinforcement strip, said coupling means being arranged to be fastened in said apertures in said spine so as to secure to said binder one or more sleeves threaded over said clip; and d) the coupling means includes a coupling device formed on the end of each leg and a flanged receptacle arranged to receive said coupling device, a flanged receptacle is inserted through each of the apertures from one side of said spine with the body section of the clip positioned on an opposite side whereby when the sleeves are threaded over the clip and the legs of the clip are inserted into said flanged receptacles, the clips and sleeves will be permanently secured in said binder.

26. A retainer assembly as defined in claim 25 wherein the coupling device has a pair of bifurcated fingers with a notch provided on an outside surface of at least one of said fingers and a shoulder is provided within said flanged receptacle whereby when the coupling device is inserted into said receptacle the notch is locked against the shoulder of said receptacle.

27. A retainer assembly for permanently securing sleeves containing disc-like objects in a binder, said binder having a front and back cover and an intermediate spine, said retainer assembly comprising:

a) an inverted U-shaped retainer clip having a body section having opposing ends and a leg extending outward in the same direction from each of said body ends, each of said legs terminating in an outwardly extending end;

b) said intermediate spine being formed from a generally rigid, sheet-like material having at least one pair of spaced apertures;

c) coupling means provided for attaching the ends of said legs to said reinforcement strip, said coupling means being arranged to be fastened in said apertures in said spine so as to secure to said binder one or more sleeves threaded over the body portion of said clip;

d) the coupling means further includes a transversely extending flanged foot formed on the end of each leg, said flanged foot having an inner flange extending towards the opposite leg and an opposite outer flange, said inner flange having a length greater than the outer flange; and e) the spine apertures are sized to have a length which is slightly greater than the length of the outer flange and the width of the attached leg whereby the flanged foot can be inserted through said spine aperture so that when sleeves are threaded over the body portion of said clip and both flanged feet are inserted through the spine apertures the sleeves will be permanently retained within said binder.

28. A retainer assembly as defined in claim 27 wherein a groove is formed on an outside surface of each leg at the junction of the flanged foot and the groove engages an edge of a spine aperture when the clip is installed in the spine.

* * * * *